(12) United States Patent
Wei et al.

(10) Patent No.: US 11,144,609 B2
(45) Date of Patent: Oct. 12, 2021

(54) METHOD AND APPARATUS FOR OBTAINING DATA BASED ON LOCATION INFORMATION

(71) Applicant: TENCENT TECHNOLOGY (SHENZHEN) COMPANY LIMITED, Guangdong (CN)

(72) Inventors: Renliang Wei, Shenzhen (CN); Hailin Lin, Shenzhen (CN); Xiaoguang Zhuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 352 days.

(21) Appl. No.: 15/571,082

(22) PCT Filed: Jul. 27, 2016

(86) PCT No.: PCT/CN2016/091947
§ 371 (c)(1),
(2) Date: Nov. 1, 2017

(87) PCT Pub. No.: WO2017/020765
PCT Pub. Date: Feb. 9, 2017

(65) Prior Publication Data
US 2018/0165293 A1    Jun. 14, 2018

(30) Foreign Application Priority Data
Aug. 3, 2015   (CN) .......................... 201510482174.0

(51) Int. Cl.
*G06F 16/9537*   (2019.01)
*G06F 16/29*   (2019.01)
(Continued)

(52) U.S. Cl.
CPC .......... *G06F 16/9537* (2019.01); *G06F 16/00* (2019.01); *G06F 16/24539* (2019.01); *G06F 16/24552* (2019.01); *G06F 16/29* (2019.01)

(58) Field of Classification Search
CPC .......... G06F 16/9537; G06F 16/24539; G06F 16/24552; G06F 16/00; G06F 16/29
See application file for complete search history.

(56) References Cited

U.S. PATENT DOCUMENTS

2008/0090589 A1 * 4/2008 Mikan ..................... H04W 8/02
                                                    455/456.1
2011/0184936 A1 * 7/2011 Lymberopoulos ..........................
                                                    G06F 16/9574
                                                    707/721

(Continued)

FOREIGN PATENT DOCUMENTS

| CN | 102523279 A | 6/2012 |
| CN | 103020125 A | 4/2013 |

(Continued)

OTHER PUBLICATIONS

International Search Report for PCT/CN2016/091947 dated Nov. 2, 2016 [PCT/ISA/210].

(Continued)

*Primary Examiner* — Apu M Mofiz
*Assistant Examiner* — Husam Turki Samara
(74) *Attorney, Agent, or Firm* — Sughrue Mion, PLLC

(57) ABSTRACT

A method and an apparatus for obtaining data, based on location information, are provided. The method includes receiving, from a user terminal, a first query request that is used to obtain object information, the first query request carrying location information of the user terminal, and querying, in response to a cache area being not empty, the cache area for hotspot data in an area range in which the location information of the user terminal is located, the (Continued)

hotspot data being information of an object included in the area range, and the hotspot data being cached in response to a frequency of query access occurring in the area range exceeding a predetermined threshold. The method further includes sending, to the user terminal, the hotspot data in the area range.

18 Claims, 14 Drawing Sheets

(51) Int. Cl.
*G06F 16/2453* (2019.01)
*G06F 16/2455* (2019.01)
*G06F 16/00* (2019.01)

(56) References Cited

U.S. PATENT DOCUMENTS

| | | | |
|---|---|---|---|
| 2013/0046780 A1* | 2/2013 | Tagawa | G06F 16/256 707/769 |
| 2013/0097163 A1* | 4/2013 | Oikarinen | G06F 16/29 707/736 |
| 2014/0297415 A1 | 10/2014 | Chu et al. | |
| 2015/0370828 A1* | 12/2015 | Maurer | G06F 16/2228 707/722 |
| 2016/0034480 A1* | 2/2016 | Seth | G06F 16/9537 707/724 |

FOREIGN PATENT DOCUMENTS

| | | |
|---|---|---|
| CN | 103023946 A | 4/2013 |
| CN | 103177005 A | 6/2013 |
| CN | 103246679 A | 8/2013 |
| CN | 103686860 A | 3/2014 |
| CN | 103944958 A | 7/2014 |
| CN | 104135715 A | 11/2014 |
| CN | 104813316 A | 7/2015 |

OTHER PUBLICATIONS

Written Opinion for PCT/CN2016/091947 dated Nov. 2, 2016 [PCT/ISA/237].
Communication dated Jul. 1, 2019, from the State Intellectual Property Office of the P.R. of China in counterpart Application No. 201510482174.0.
Translation of Written Opinion in International Application No. PCT/CN2016/091947, dated Nov. 2, 2016.

* cited by examiner

METHOD AND APPARATUS FOR OBTAINING DATA BASED ON LOCATION INFORMATION

CROSS-REFERENCE TO RELATED APPLICATION

This application is a U.S. national stage application under 35 U.S.C. § 371 of International Patent Application No. PCT/CN2016/091947, filed on Jul. 27, 2016, which claims priority from Chinese Patent Application No. 201510482174.0, entitled "METHOD AND APPARATUS FOR OBTAINING DATA BASED ON LOCATION INFORMATION" and filed on Aug. 3, 2015, in the Chinese Patent Office, the disclosures of which are incorporated herein by reference in their entireties.

BACKGROUND

1. Field

Methods and apparatuses consistent with example embodiments relate to data processing, and specifically to a method and an apparatus for obtaining data based on location information.

2. Description of Related Art

A location based service (LBS for short) is a value-added service in which location information (such as geographic coordinates or terrestrial coordinates) of a user having a mobile terminal is obtained by using a radio communications network (such as a GSM network or a CDMA network) of a telecommunications mobile operator or in an external positioning manner (such as GPS), and a corresponding service is provided to the user with the support of a geographic information system (GIS for short) platform.

The LBS includes two meanings: the first meaning is to determine a geographic location of a mobile device or user; the second meaning is to provide various information services related to the geographic location. For example, a current geographic location (such as a location in Beijing) of a mobile phone user is found, and then in the range of Beijing, information such as names and addresses of hotels, cinemas, libraries, gas stations in a range of 1 kilometer away from the current location of the mobile phone user are searched.

In the existing technology, information about a merchant (such as information about names and addresses of restaurants, supermarkets, hospitals, hotels, cinemas, libraries, and gas stations) nearby a mobile terminal or a user may be searched by using the mobile terminal or longitude and latitude information of the user. Specifically, a covered geographic section is divided according to a fixed range (for example, a geographic section corresponding to Beijing is divided into multiple squares whose side length is 1 kilometer), to obtain multiple sections through division, and all merchant information included in each section obtained through division is used as service data to be cached into a background server.

When a user in a section sends location information (such as, longitude and latitude information of the user) to a background server to request nearby merchant information (such as information about restaurants in a range of 1 kilometer away from a current location of the user), a section that is hit is judged according to the longitude and latitude information of the user, and then service data corresponding to the section stored in a cache is directly obtained.

However, the search solution in the existing technology has the following disadvantages:

(1) When users have different needs, for example, one of two users located at a same place requests information about nearby merchants in 100 meters, and the other user requests information about nearby merchants in 500 meters, in this case, service data needs to be separately cached for requirements of these two users. Because information about all merchants in nationwide sections needs to be wholly stored, occupied storage space is relatively large.

(2) Section division needs to be performed according to a geographic range covered merchants (for example, for a same region, division needs to be performed for multiple times according to different fixed ranges, to satisfy user requirements), information about all merchants in different sections has a large data amount, a relatively long time needs to be cost during service data construction, and relatively large storage space is needed, causing quite cumbersome service data construction.

(3) When the size of a section is updated, because the section is denoted by two-dimensional longitude and latitude information, operations are cumbersome when the range of the section is updated, and all service data in the section needs to be reconstructed, update efficiency is low.

For the technical problem in the existing technology that all merchant information needs to be cached in a background server when information about nearby merchants is searched according to longitude and latitude, occupying relatively large storage space, no effective solution has been put forward.

SUMMARY

According to example embodiments, there is provided a method for obtaining data, based on location information. The method includes receiving, from a user terminal, a first query request that is used to obtain object information, the first query request carrying location information of the user terminal, and querying, in response to a cache area being not empty, the cache area for hotspot data in an area range in which the location information of the user terminal is located, the hotspot data being information of an object included in the area range, and the hotspot data being cached in response to a frequency of query access occurring in the area range exceeding a predetermined threshold. The method further includes sending, to the user terminal, the hotspot data in the area range.

According to example embodiments, there is provided an apparatus for obtaining data based on location information. The apparatus includes a receiver configured to receive, from a user terminal, a query request that is used to obtain object information, the query request carrying location information of the user terminal, and a processor configured to query, in response to a cache area being not empty, the cache area for hotspot data in an area range in which the location information of the user terminal is located, the hotspot data being information of an object included in the area range, and the hotspot data being cached in response to a frequency of query access occurring in the area range exceeding a predetermined threshold. The apparatus further includes a transmitter configured to send, to the user terminal, the hotspot data in the area range.

According to example embodiments, there is provided a non-transitory computer-readable storage medium storing program code including instructions for causing a computer to receive, from a user terminal, a first query request that is used to obtain object information, the first query request carrying location information of the user terminal, and query, in response to a cache area being not empty, the cache area for hotspot data in an area range in which the location information of the user terminal is located, the hotspot data being information of an object included in the area range, and the hotspot data being cached in response to a frequency of query access occurring in the area range exceeding a predetermined threshold. The instructions are further for causing the computer to send, to the user terminal, the hotspot data in the area range.

DETAILED DESCRIPTION OF EXAMPLE EMBODIMENTS

A term involved in example embodiments of this application is explained as follows:

GeoHash algorithm: is to convert two-dimensional longitude and latitude information into a character string code that can be sorted and compared. The GeoHash algorithm has the following several characteristics. First, the GeoHash algorithm is to denote longitude and latitude information by using a character string code; secondly, the character string code obtained through conversion by using the GeoHash algorithm denotes a rectangular area other than a point; thirdly, a prefix of the character string code may denote a larger area, and this characteristic may be used to search for a nearby place.

Figure 1:
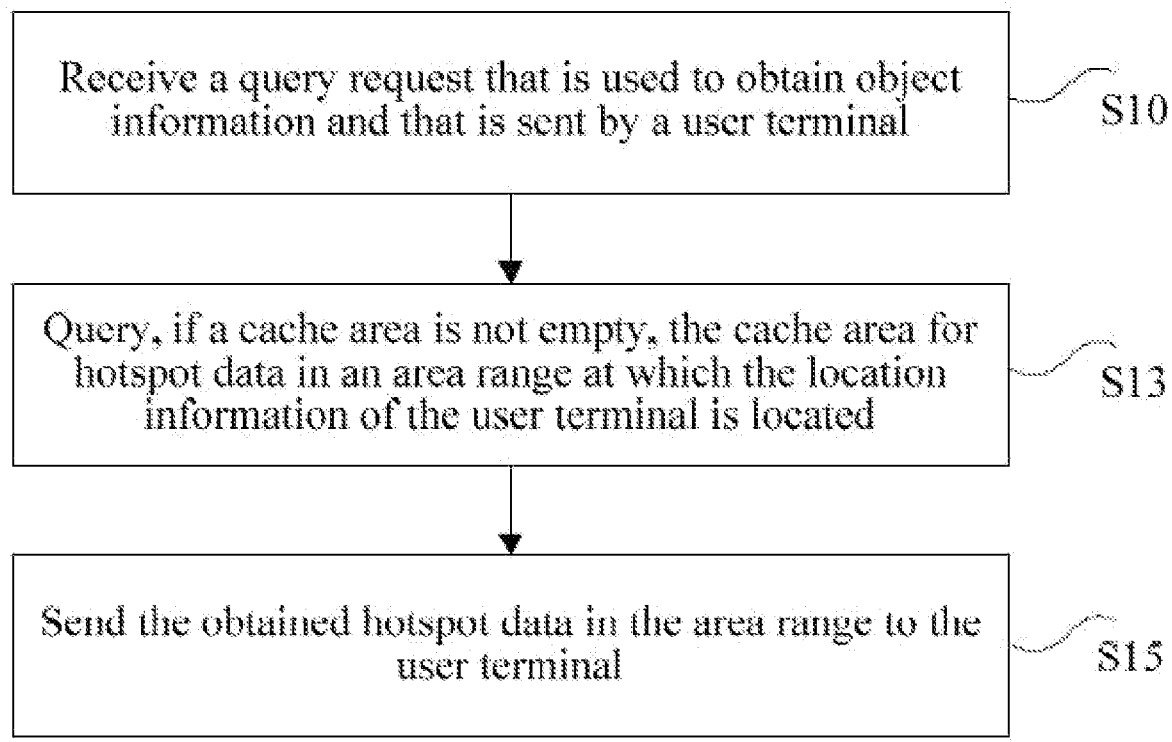
FIG. 1 is a flowchart of a method for obtaining data based on location information according to example embodiments.

FIG. 1 is a flowchart of a method for obtaining data based on location information according to example embodiments.

Referring to FIG. 1, step S10 includes receiving a query request that is used to obtain object information and that is sent by a user terminal, the query request carrying location information of the user terminal.

In an example embodiment, the query request that is used to obtain the object information and that is sent by the user terminal may be received by using a background server.

In step S10, the user terminal may be a personal computer or a mobile terminal, such as a smartphone, a notebook computer, or a tablet computer. The foregoing object may be a merchant nearby the user terminal, and the object information may include any one or more types of the following data: a distance between a merchant and the user terminal (such as less than 500 meters), geographic area information of a merchant (such as city XX, district XX), street information of a merchant, longitude and latitude information of a merchant, a shop name of a merchant and whether a merchant has a discounting activity.

The merchant may be a restaurant, a cinema, a hotel, a KTV, or a scenic spot.

In step S10, the location information of the user terminal may include at least one type of the following information: longitude and latitude information, street information, geographic area information, and business district information.

In an example embodiment, before the background server receives the query request sent by the user terminal, the user terminal may generate the corresponding query request. The query request may be generated by using an application program installed in the user terminal. When the user holding the user terminal needs to obtain object information (such as, the user needs to obtain information about a restaurant nearby the user), the user may generate, by using the user terminal of the user, the query request carrying the location information of the user terminal, then the user terminal may send the query request to the background server, and the background server may receive the query request used to obtain the object information and sent by the user terminal.

The query request may be generated by using an application program installed in the user terminal. For example, an application scenario in which the user terminal is a smartphone and in which an application program installed in the user terminal is a mobile QQ application program, may be used an as example. When the user holding the smartphone intends to obtain information about a restaurant nearby the user, the user may click "status" in the interface of the mobile QQ application program, and further select a "food and amusement" option in "status," enter the interface of the "food and amusement" option, and then select "foods" on the top left corner. In this case, the mobile QQ application program may send a query request to the background server according to the option selected by the user and the location information of the mobile phone (such as a specific location of the For another example, an application scenario in which the user terminal is a smartphone and in which an application program installed in the user terminal is mobile WeChat, may be used as an example. When the user holding the smartphone intends to obtain information about a restaurant nearby the user, the user may click "I" in the interface of the mobile WeChat, and further select a "food and amusement" option in "I," enter the interface of the "food and amusement" option, and then select "foods" on the top left corner. In this case, the mobile WeChat may send a query request to the background server according to the option selected by the user and the location information of the mobile phone (such as a specific location of the user).

Step S13 includes querying, if a cache area is not empty, the cache area for hotspot data in an area range at which the location information of the user terminal is located, the hotspot data being information about an object included in the area range that is cached when a frequency of query access occurring in the area range exceeds a predetermined threshold.

In step S13, after the query request sent by the user terminal is received, when the cache area of the background server is not empty, the background server may query the cache area for the hotspot data in the area range at which the foregoing location information is located.

The area range may be a range covering a preset geographic section, and the hotspot data of the area range may include object information of all merchants in the coverage range of the area range.

The range covered by the area range may be dynamically adjusted according to needs, specific content may be introduced in subsequent embodiments of this application, and details are not described herein.

In an example embodiment, the hotspot data may be triggered by the user, and when merchant information corresponding to an area range is queried for a relatively large quantity of times, a hit rate of the merchant information in the area range stored in the cache area may be relatively high, and the area range may be considered as the hotspot data. When a frequency of query access occurring in the area range exceeds a predetermined threshold, that is, a quantity of user terminals that execute a query operation in the area range is relatively large, or a quantity of users that gather in the area range is relatively large, the area range may be determined as a hotspot region, and object information of all objects included in the hotspot region may be cached as the hotspot data in the area range (that is, the hotspot region).

The predetermined threshold may be set according to actual application requirements.

Figure 2A:
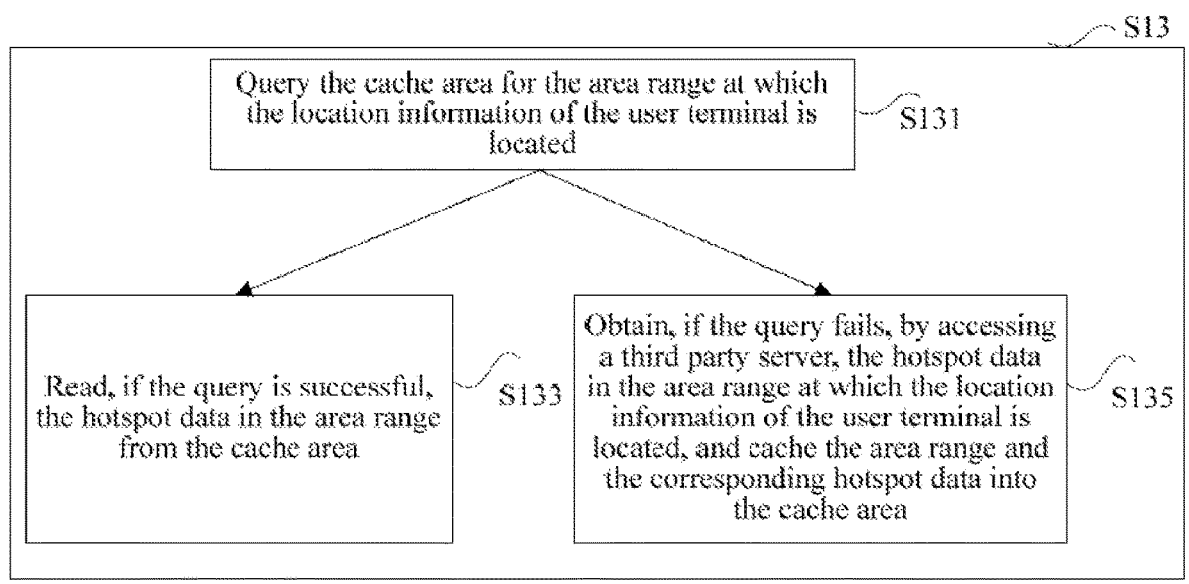
FIGS. 2A, 2B, and 2C are flowcharts of a method for obtaining data based on location information according to example embodiments.
Figure 2B:
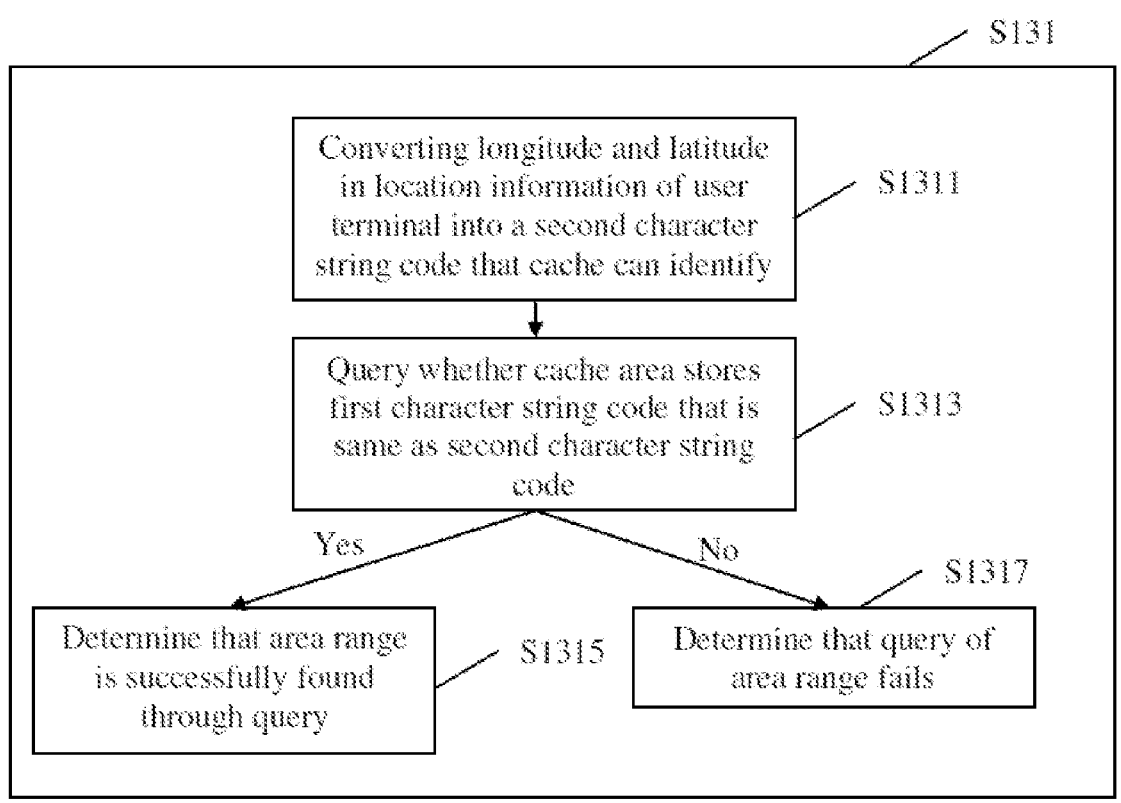
Figure 2C:
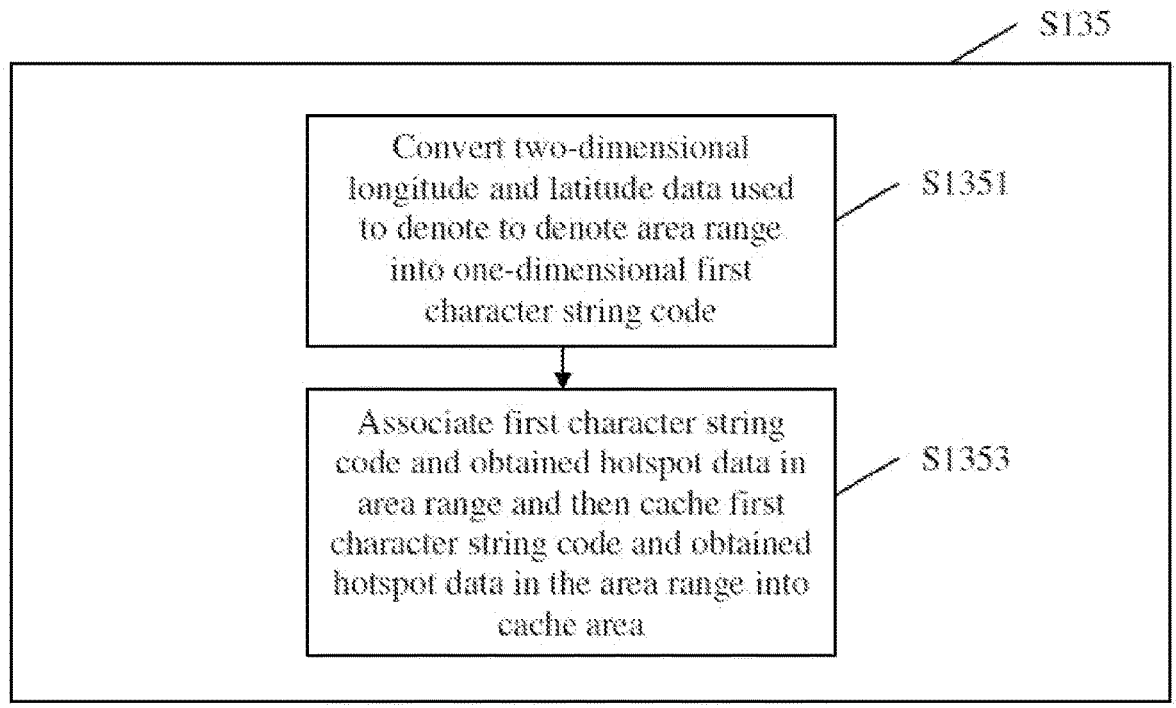

According to example embodiments, step S13 of querying the cache area for hotspot data in an area range at which the location information of the user terminal is located may include steps shown in FIGS. 2A, 2B, and 2C.

FIGS. 2A, 2B, and 2C are flowcharts of a method for obtaining data based on location information according to example embodiments.

Referring to FIG. 2A, step S131 includes querying the cache area for the area range at which the location information of the user terminal is located, where the cache area caches at least a preset area range, and the hotspot data in the area range.

After the query request sent by the user terminal is received, the background server may detect whether the cache area is empty; and when it is detected that the cache area of the background server is not empty, the cache area may be queried for the area range of the user terminal according to the location information of the user terminal.

An application scenario in which the user terminal is a smartphone and in which an application program installed in the user terminal is a mobile QQ application program, may be used. After the mobile QQ application program sends the query request carrying the location information of the current place of the mobile phone (such as longitude and latitude information) to the background server, the background server may detect whether the cache area of the background server is empty, and if it is detected that the cache area is not empty, the cache area may be queried, according to the longitude and latitude information of the user, for the area range to which the current place of the mobile phone belongs.

The cache area of the background server may cache at least a preset area range and hotspot data in the area range, where the area range and the hotspot data in the area range have an association relationship. When the area range is found through query, the hotspot data in the area range may be read.

Step S133 includes reading, if the query is successful, the hotspot data in the area range from the cache area.

When the area range of the location information of the user terminal is successfully found through query, that is, the query is successful, the hotspot data in the area range may be read from the cache area.

An application scenario in which the user terminal is a smartphone and in which an application program installed in the user terminal is a mobile QQ application program, may be used as an example. After the mobile QQ application program sends the query request carrying the location information of the current place of the mobile phone (such as longitude and latitude information) to the background server, the background server may detect whether the cache area of the background server is empty, and if it is detected that the cache area is not empty, the cache area may be queried, according to the longitude and latitude information of the user, for the area range to which the current place of the mobile phone belongs. After the area range to which the current place of the mobile phone belongs is successfully found through query (such as a range of 500 meters nearby the Zhichunlu metro station, Haidian district, Beijing), information about all restaurants in the range of 500 meters nearby the Zhichunlu metro station, Haidian district, Beijing may be read from the cache such as a restaurant name, a distance away from the current place of the mobile phone, whether there is a discounting activity, and a specific restaurant location.

Step S135 includes obtaining, if the query fails, by accessing a third party server, the hotspot data in the area range at which the location information of the user terminal is located, and cache the area range and the corresponding hotspot data into the cache area.

When the area range at which the location information of the user terminal is located is not found through query, that is, the query fails, the background server may forward the query request sent by the user terminal to the third party server (such as a server of an external partnership merchant) for processing, the hotspot data in the area range at which the location information of the user terminal is located may be obtained by accessing the third party server, and the obtained hotspot data in the area range and the area range may be associated and then cached into the cache area of the background server.

In an example embodiment, after the hotspot data in the area range at which the location information of the user terminal is located is obtained by accessing the third party server, and the area range and the corresponding hotspot data are cached into the cache area, if the query request used to obtain the object information in the area range is again received, the method may return to execute steps S13 to S15, where in a process of executing step S13, the hotspot data in the area range does not need to be obtained again by accessing the third party server, and the hotspot data in the area range may be directly read from the cache area, thereby alleviating a processing pressure of the third party server.

The obtaining the hotspot data in the area range at which the location information of the user terminal is located by accessing the third party server may be implemented by forwarding the query request to the interface of the third party server (such as a merchant interface of the external partnership merchant). A processing capability of the merchant interface of the external partnership merchant may be limited, and therefore, by using the foregoing example embodiments, the pressure of the merchant interface may be greatly alleviated, that is, the processing pressure of the third party server may be alleviated.

Further, after the hotspot data is obtained by accessing the third party server, the obtained hotspot data may be directly returned to the user terminal by using the third party server, and the hotspot data may be returned to the background server, so that the background server caches the hotspot data and the corresponding area range into the cache area. Alternatively, after the background server completes caching, the background server may return the hotspot data to the user terminal.

With reference to the foregoing application scenario in which the user terminal is a smartphone and in which an application program installed in the user terminal is a mobile QQ application program, an example in which the third party server is a server of Qianping.com may be used.

For example, after the mobile QQ application program sends the query request carrying the location information of the current place of the mobile phone (such as longitude and latitude information) to the background server, the background server may detect whether the cache area of the background server is empty, and if it is detected that the cache area is not empty, the cache area may be queried, according to the longitude and latitude information of the user, for the area range to which the current place of the mobile phone belongs.

In an example embodiment, after the area range to which the current place of the mobile phone belongs is not found through query from the cache area, the query request of the user may be forwarded to the server of Qianping.com for processing. The server of Qianping.com may determine, according to the current place of the mobile phone, the area range to which the current place belongs (such as the range of 500 meters nearby the Zhichunlu metro station, Haidian district, Beijing), and may return all restaurant information in the area range (such as a restaurant name, a distance away from the current place of the mobile phone, whether there is a discounting activity and a specific restaurant location) to the background server. The background server may associate the hotspot data returned by the server of Qianping.com and the corresponding area range (such as the range of 500 meters nearby the Zhichunlu metro station, Haidian district, Beijing), and then cache the hotspot data and the corresponding area range into the cache area.

When the query request used to obtain the object information in the area range is again received, the corresponding hotspot data does not need to be obtained again by using the third party server, and the hotspot data may be directly read from the cache area, thereby alleviating the processing pressure of the third party server.

Referring again to FIG. 1, step S15 includes sending the obtained hotspot data in the area range to the user terminal.

After the hotspot data in the area range at which the location information of the user terminal is located is obtained through query, the hotspot data may be returned to the user terminal.

An application scenario in which the user terminal is a smartphone and in which an application program installed in the user terminal is a mobile QQ application program, may be used as an example. After the mobile QQ application program sends the query request carrying the location information of the current place of the mobile phone (such as longitude and latitude information) to the background server, the background server may detect whether the cache area of the background server is empty, and if it is detected that the cache area is not empty, the cache area may be queried, according to the longitude and latitude information of the user, for the area range to which the current place of the mobile phone belongs. After all restaurant information (such as a restaurant name, a distance away from the current place of the mobile phone, whether there is a discounting activity and a specific restaurant location) in the area range to which the current place of the mobile phone belongs (such as the range of 500 meters nearby the Zhichunlu metro station, Haidian district, Beijing) is obtained by using the cache area or by using the third party server, the background server may return all the obtained restaurant information to the mobile QQ application program, and the mobile QQ application program may present the received hotspot data on a display interface, for the user to view.

In an example embodiment, after the query request sent by the user terminal is received, the cache area may be queried, according to the location information of the user terminal carried in the query request, for the hotspot data in the area range at which the location information is located, to send the object information in the area range at which the location information is located to the user terminal. In an example embodiment, by storing, in the cache area, the hotspot data (such as merchant information) of the area range in which many users gather, it may be ensured that when obtaining information about a nearby merchant, most users may find the corresponding hotspot data through query from the cache area. For example, if no user executes a query operation at a remote place, merchant information of the remote place may not be cached, which differs from the existing technology in which a nationwide covered geographic section is divided according to a fixed range and all merchant information in each section is cached after division. That is, all merchant information in each nationwide section may not need to be wholly stored, to reduce needed storage space, thereby reducing the storage pressure of the background server. In an example embodiment, the technical problem in the existing technology that all merchant information may need to be cached in a background server when information about nearby merchants is searched according to longitude and latitude, occupying relatively large storage space, may be resolved, thereby achieving an effect of reducing occupation of storage space of the background server and reducing the storage pressure of the background server.

Referring to FIGS. 2A and 2C, in an example embodiment, step S135 of caching the area range and the corresponding hotspot data into the cache area may include steps that are discussed below.

Step S1351 includes converting two-dimensional longitude and latitude data used to denote the area range into a one-dimensional first character string code.

After the hotspot data in the area range at which the location information of the user terminal is located is obtained by accessing the third party server, the background server may convert the two-dimensional longitude and latitude data used to denote the area range into the one-dimensional first character string code.

In an example embodiment, a two-dimensional longitude and latitude data may be converted, by using the GeoHash algorithm, into a one-dimensional character string code that can be sorted and compared, and each character string code may denote an area range. When the length of a GeoHash character string code is a longer, precision of an area range denoted by the GeoHash character string code is higher. For example, when the length of a GeoHash character string code is 8, precision of an area range denoted by the GeoHash character string code may be approximately 19 meters, and when the length of a GeoHash character string code is 9, precision of an area range denoted by the GeoHash character string code may be approximately 2 meters. The length of a character string code needs to be selected according to a data status.

Step S1353 includes associating the first character string code and the obtained hotspot data in the area range and then cache the first character string code and the obtained hotspot data in the area range into the cache area.

After the background server converts the two-dimensional longitude and latitude data used to denote the area range into the one-dimensional first character string code, the first character string code and the obtained hotspot data in the area range may be associated and then cached into the cache area of the background server.

An application scenario in which two-dimensional longitude and latitude data is converted into a one-dimensional character string code by using the GeoHash algorithm may be used as an example. For example, a geographic range covered by Beijing may be divided into 9 area ranges (such as rectangular areas) in advance, first character string codes (such as GeoHash character strings) of the rectangular areas may be separately WX4ER, WX4G2, WX4G3 and the like, and each GeoHash character string may represent a rectangular area. That is, all points (locations of the points are denoted by using longitude and latitude coordinates) in this rectangular area may share a same GeoHash character string. In this way, privacy may be protected (only a rough area location other than a specific point is denoted), and it may be relatively easy to perform caching. For example, a user in this rectangular area WX4ER may continuously send location information to the background server to request information about a restaurant nearby the user (that is, the foregoing hotspot data). GeoHash character strings of all users in this rectangular area WX4ER may be WX4ER, therefore WX4ER may be used as a key, and the hotspot data of the rectangular area may be used as a value to be cached. If GeoHash is not used, because longitude and latitude data sent by users in a same rectangular area differs from each other, it may be very difficult to perform caching.

Similar GeoHash character strings may denote close distances, and in this way, nearby merchant information may be queried by using prefix matching between GeoHash character strings.

Using the foregoing example embodiments, because two-dimensional longitude and latitude data is converted into a one-dimensional first character string code, the area range denoted by the first character string code may be adjusted by conveniently adjusting the length of the first character string code and according to the frequency of query access occurring in the area range, that is, the geographic range covered by the area range may be conveniently adjusted. This may resolve a problem in the existing technology that a section is divided according to a fixed range, and when the size of the section is updated, the update operation is cumbersome and the update efficiency is low, thereby adjusting the size of the area range conveniently, rapidly, and dynamically.

Referring to FIGS. 2A and 2B, step S131 of querying the cache area for the area range at which the location information of the user terminal is located may include steps that are discussed below.

Step S1311 includes converting longitude and latitude data in the location information of the user terminal into a second character string code that the cache area can identify.

When the cache area of the background server is not empty, the longitude and latitude data in the location information of the user terminal carried in the received query request may be converted into a second character string code that the cache area can identify.

An application scenario in which two-dimensional longitude and latitude data is converted into a one-dimensional character string code by using the GeoHash algorithm may be used as an example. For example, the longitude and latitude data of the user terminal may be converted into a one-dimensional GeoHash character string by using the GeoHash algorithm.

Step S1313 may include querying whether the cache area stores the first character string code that is the same as the second character string code.

If it is found through query that the cache area stores the first character string code the same as the second character string code, step S1315 is executed; if the cache area does not store the first character string code the same as the second character string code, step S1317 is executed.

Whether the cache area of the background server stores the first character string code the same as the second character string code may be queried.

When the longitude and latitude data of the user terminal falls within an area range, a GeoHash character string (that is, the foregoing second character string code) obtained by converting the longitude and latitude data of the user terminal by using the GeoHash algorithm may be the same as a GeoHash character string (that is, the foregoing first character string code) obtained by converting, by using the GeoHash algorithm, the longitude and latitude data used to denote the area range. If the first character string code the same as the second character string code is found through query from the cache area, it may denote that the cache area stores the hotspot data of the area range, and in this case it may be determined that the area range is successfully found through query. If the first character string code the same as the second character string code is not found through query from the cache area, it may denote that the cache area does not store the hotspot data of the area range, and in this case it may be determined that the query of the area range fails.

Step S1315 includes determining that the area range is successfully found through query.

If the area range is successfully found through query, the hotspot data in the area range is read from the cache area, the implementation manner of step S1315 may be consistent with the implementation manner of step S133 in the foregoing example embodiments, and details are not described herein again.

Step S1317 includes determining that the query of the area range fails.

If the query of the area range fails, the hotspot data in the area range at which the location information of the user terminal is located may be obtained by accessing the third party server, and the area range and the corresponding hotspot data may be cached into the cache area. The implementation manner of step S1317 may be consistent with the implementation manner of step S135 in the example embodiments, and details are not described herein again.

With reference to the foregoing application scenario in which the user terminal is a smartphone and in which an application program installed in the user terminal is a mobile QQ application program, an example in which the third party server is a server of Qianping.com may be used below.

For example, after the mobile QQ application program sends the query request carrying the location information of the current place of the mobile phone (such as longitude and latitude information) to the background server, the background server may detect whether the cache area of the background server is empty, and if it is detected that the cache area is not empty, longitude and latitude information of the user may be converted into a one-dimensional second character string code by using the GeoHash algorithm, and whether the cache area stores a first character string code (a character string code used to denote the area range) the same as the second character string code may be queried.

In an example embodiment, when the cache area storing the first character string code the same as the second character string code is successfully found through query, it may be determined that the query of the area range is successful, that is, the cache area stores the hotspot data of the area range to which the current place of the mobile phone belongs (such as the range of 500 meters nearby the Zhichunlu metro station, Haidian district, Beijing), and then all restaurant information in the range of 500 meters nearby the Zhichunlu metro station, Haidian district, Beijing may be read from the cache area and returned to the mobile QQ application program, for the user to view.

When the cache area storing the first character string code the same as the second character string code is not found through query, it may be determined that the query of the area range fails, that is, the cache area does not store the hotspot data of the area range to which the current place of the mobile phone belongs. Then, the background server may forward the query request of the user to the server of Qianping.com for processing. The server of Qianping.com may determine, according to the current place of the mobile phone, the area range (such as the range of 500 meters nearby the Zhichunlu metro station, Haidian district, Beijing) to which the current place of the mobile phone belongs, and return all restaurant information in the area range (such as a restaurant name, a distance away from the current place of the mobile phone, whether there is a discounting activity and a specific restaurant location) to the background server. The background server may convert the corresponding area range (such as the range of 500 meters nearby the Zhichunlu metro station, Haidian district, Beijing) into a one-dimensional first character string code by using the GeoHash algorithm, associate the first character string code and the hotspot data that is returned by the server of Qianping.com and then cache the first character string code and the hotspot data into the cache area.

The server of Qianping.com may return the hotspot data to the mobile QQ application program, for the user to view. Alternatively, after the background server caches the first character string code and the returned hotspot data into the cache area, the hotspot data may be returned to the mobile QQ application program.

By using the foregoing example embodiments, when merchant information nearby the user terminal is queried according to the location of the user terminal, it may be only needed to convert the longitude and latitude data of the location of the user terminal into a one-dimensional GeoHash character string, and perform prefix matching between the one-dimensional GeoHash character string and a GeoHash character string of each area range stored in the cache area. When the GeoHash character string of the area range is the same as the GeoHash character string of the location of the user terminal, it may be determined that the cache area stores the area range of the location of the user terminal, the query may be convenient and quick, and the query efficiency may be high.

In the foregoing example embodiments, at the same time of or after the associating the first character string code and the obtained hotspot data in the area range and then caching the first character string code and the obtained hotspot data in the area range into the cache area, the method may further include: setting a preset expiration time for the hotspot data, where the expiration time is determined according to a frequency at which the hotspot data is queried; and deleting, when time for which the hotspot data is stored in the cache area reaches the expiration time, the hotspot data from the cache area.

At the same time when or after the obtained hotspot data and a first character string that is used to denote the corresponding area range are associated by using the third party server and cached into the cache area, a preset expiration time may be set for the hotspot data. When time for which the hotspot data is stored in the cache area reaches the expiration time, the hotspot data may be deleted from the cache area, to achieve an effect of updating the hotspot data in time.

In an example embodiment, after hotspot data in an area range reaches an expiration time of the hotspot data and is deleted, if the background server again receives the query request used to obtain the object information in the area range, to the method may return to execute steps S10 to S15 of FIG. 1. In this case, because the background server does not store the hotspot data in the area range, the corresponding hotspot data may need to be obtained by accessing the third party server. Therefore, the length of the expiration time may be related to the processing pressure of the third party server, and if the expiration time is relatively short, the third party server may need to process the query request of the user terminal for multiple times. Consequently, the processing capability of the third party server may become a bottleneck of the entire system, the query efficiency may be affected, the query request sent by the user terminal cannot be processed in time, a user wait time may be long, and user experience may poor. If the expiration time is relatively long, merchant information in the area range cannot be updated in time.

The expiration time may be determined according to the frequency of querying for the hotspot data, that is, determined according to the hit rate of the hotspot data.

In an example embodiment, when the query request sent by the user terminal is to request to obtain object information in an area range, the cache area may store hotspot data in the area range. In this case, it may indicate that the hotspot data is hit, and a larger quantity of times of hitting the hotspot data may indicate a higher hit rate of the hotspot data.

In an example embodiment, when one or more merchants in an area range perform a discounting activity, more users may be attracted in a short time to execute a query operation in the area range. In this case, a relatively long expiration time such as 1 day or 2 days may be set for hotspot data in the area range, to prevent the hotspot data in the area from being repetitively updated in a short time, so as not to cause a large processing pressure to the background server and the third party server.

By using the foregoing example embodiments, setting the expiration time for the hotspot data may ensure that merchant information in the corresponding area range is updated in time and effectively, to provide recent merchant information to the user. For example, when a merchant is added or a merchant discounting activity is added, related information may be provided to the user in time.

With reference to the foregoing application scenario in which the user terminal is a smartphone and in which an application program installed in the user terminal is a mobile QQ application program, an example in which the third party server is a server of Qianping.com may be used below. After the background server forwards the query request of the user to the server of Qianping.com for processing, the server of Qianping.com may determine, according to the current place of the mobile phone, the area range (such as the range of 500 meters nearby the Zhichunlu metro station, Haidian district, Beijing) to which the current place of the mobile phone belongs, and return all restaurant information in the area range to the background server, at the same time when or after the background server converts the corresponding area range (such as the range of 500 meters nearby the Zhichunlu metro station, Haidian district, Beijing) into a one-dimensional first character string code by using the GeoHash algorithm, associates the first character string code and the hotspot data that is returned by the server of Qianping.com, and then caches the first character string code and the hotspot data into the cache area The background server may set an expiration time corresponding to the hotspot data for the hotspot data, and the expiration time may be dynamically adjusted according to a hit rate of the hotspot data. That is, when the hit rate of the hotspot data is relatively high, that is, when more users in the corresponding area range execute a query operation, the expiration time of the hotspot data may be prolonged, to alleviate the pressure under which the background server repetitively updates the hotspot data in the area range. When the hit rate of the hotspot data is reduced to a value less than the predetermined threshold, it may be considered that a quantity of users in the corresponding area range is relatively low, and that the hotspot data does not need to be stored for a long time again. In this case, the expiration time of the hotspot data may be shortened, to prevent cached data of little use from occupying the storage space of the background server for a long time.

In the foregoing example embodiments, during the querying the cache area for the area range at which the location information of the user terminal is located, the method may further include: monitoring a quantity of query times of querying the cache area for the same area range; adjusting, when it is monitored that the quantity of query times of querying the cache area for the same area range exceeds a preset query threshold, precision of the first character string code to expand a coverage range of the queried area range; obtaining an adjusted area range; obtaining, after a query request used to obtain object information in the adjusted area range is received, hotspot data in the adjusted area range by accessing the third party server; and caching the adjusted area range and the corresponding hotspot data into the cache area.

A quantity of query times of querying the cache area for the same area range may be monitored, that is, the hit rate of each hotspot data in the cache area may be monitored. When it is monitored that the quantity of query times of querying the cache area for the same area range exceeds a preset query threshold, it may indicate that more users in the area range execute a query operation. If more users at an external edge of the area range also query for object information, the users at the external edge may not hit the hotspot data in the area range. In this case, the processing pressure of the third party server may be excessively large, the query request sent by the user terminal cannot be processed in time, a user wait time may be long, and user experience may be poor. Therefore, when it is monitored that the quantity of query times of querying the cache area for the same area range exceeds a preset query threshold, the precision of the first character string code may be reduced by shortening the length of the first character string code, to expand a coverage range of the queried area range, and an adjusted area range may be obtained. The adjusted area range may cover a larger geographic range.

Further, after the adjusted area range is obtained, and after the query request used to obtain object information in the adjusted area range is received, the hotspot data of the adjusted area range may be obtained by accessing the third party server, and the adjusted area range and the corresponding hotspot data may be associated and then cached into the cache area. The specific implementation manner of the step may be consistent with the implementation manner of step S135 of FIG. 2A, and details are not described herein again.

In an example embodiment, after the hotspot data in the adjusted area range is located is obtained by accessing the third party server, and the adjusted area range and the corresponding hotspot data are associated and then cached into the cache area, if the query request used to obtain the object information in the adjusted area range is again received, the method may return to execute steps S13 to S15 of FIG. 1, where in a process of executing step S13, the hotspot data in the area range may not need to be obtained again by accessing the third party server, and the hotspot data in the area range may be directly read from the cache area, thereby alleviating a processing pressure of the third party server.

The obtaining the hotspot data in the adjusted area range by accessing the third party server may be implemented by forwarding the query request to the interface of the third party server (such as a merchant interface of the external partnership merchant). A processing capability of the merchant interface of the external partnership merchant may be limited, and therefore, by using the foregoing example embodiments, the pressure of the merchant interface may be greatly alleviated, and the processing pressure of the third party server is alleviated.

With reference to the foregoing application scenario in which the user terminal is a smartphone and in which an application program installed in the user terminal is a mobile QQ application program, an example in which the third party server is a server of Qianping.com may be used below. When the background server monitors that a quantity of query times of querying the cache area for the same area range (such as a range of 300 meters nearby Beijing Tiananmen Square) exceeds a preset query threshold, it may indicate that more users in the range of 300 meters nearby Beijing Tiananmen Square execute a restaurant information query operation by using mobile QQ application programs of the users. In this case, if more users are in the range of 300 meters to 1500 meters nearby Beijing Tiananmen Square and execute a nearby restaurant information query operation by using mobile phones of the users, the query operation of the users in the range of 300 meters to 1500 meters nearby Beijing Tiananmen Square cannot hit the hotspot data (such as restaurant information) in the range of 300 meters nearby Beijing Tiananmen Square. In this case, the server of Qianping.com may need to process query requests of the users. Because the processing capability of the server of Qianping.com is limited, and the server can process only a limited quantity of (such as 1000) query requests, some users may wait for a relatively long time, causing a poor user experience. In this case, a code length of a GeoHash character string used to denote the range of 300 meters nearby Beijing Tiananmen Square may be reduced, such as reduced from a 6-bit code (denoting a range of approximately 0.34 square kilometer) to a 5-bit code (denotes 10 square kilometer range), thereby denoting the area range of 1500 meters nearby Beijing Tiananmen Square. After the adjusted area range (such as the range of 1500 meters nearby Beijing Tiananmen Square) is obtained, and after the query request used for querying for nearby restaurant information and sent by the mobile QQ application program is received, the background server may forward the query request of the user to the server of Qianping.com for processing. The server of Qianping.com may determine, according to the current place of the mobile phone, the area range (such as the range of 1500 meters nearby Beijing Tiananmen Square) to which the current place of the mobile phone belongs, and return all restaurant information in the area range (such as a restaurant name, a distance away from the current place of the mobile phone, whether there is a discounting activity, and a specific restaurant location) to the background server. The background server may associate the hotspot data returned by the server of Qianping.com and the corresponding area range (such as the range of 1500 meters nearby Beijing Tiananmen Square), and then cache the hotspot data and the corresponding area range into the cache area. When the query request used to obtain object information in the range of 1500 meters nearby Beijing Tiananmen Square (such as a query request used to obtain nearby restaurant information) is again received, it may not be needed to again obtain the corresponding hotspot data (such as restaurant information) by using the server of Qianping.com, and the hotspot data may be directly read from the cache area, thereby alleviating the processing pressure of the server of Qianping.com.

According to the foregoing example embodiments, during the obtaining, by accessing a third party server, the hotspot data in the area range at which the location information of the user terminal is located, the method may further include: monitoring an access amount of the third party server; and prolonging, if the access amount of the third party server exceeds a preset access threshold, the expiration time of the hotspot data according to the access amount.

During the obtaining, by accessing a third party server, the hotspot data in the area range at which the location information of the user terminal is located, because the processing capability of the third party server is limited, to prevent the processing capability of the third party server from causing a system processing bottleneck, and prevent the user from waiting for a long time to reduce user experience, an access amount of the third party server may need to be monitored, that is, a quantity of query requests processed by the third party server may need to be monitored. When it is monitored that the access amount of the third party server exceeds a preset access threshold, it may be considered that in this case, the processing capability of the third party server reaches the limit, and the third party server cannot continue to process other query requests in time. To alleviate the pressure of the third party server, the expiration time of the corresponding hotspot data may be prolonged according to the size of the access amount, and by preventing the hotspot data from being repetitively updated in a short time, the processing pressure of the third party server may be reduced.

With reference to the foregoing application scenario in which the user terminal is a smartphone and in which an application program installed in the user terminal is a mobile QQ application program, an example in which the third party server is a server of Qianping.com may be used. In a process of obtaining the hotspot data (such as restaurant information) in the area range of the mobile phone (such as the range of 500 meters nearby the Zhichunlu metro station, Haidian district, Beijing) by accessing the server of Qianping.com, if the background server monitors that a quantity of query requests forwarded to the server of Qianping.com exceeds a preset access threshold, it may indicate that the processing capability of the server of Qianping.com has reached its upper limit. In this case, if a query request is still forwarded to the server of Qianping.com, a subsequent query request cannot be processed temporarily, and consequently some users may need to wait for a relatively long time, reducing user experience. In this case, the expiration time of the restaurant information corresponding to the range of 500 meters nearby the Zhichunlu metro station, Haidian district, Beijing may be prolonged, so that the storage time of the restaurant information in the cache area is prolonged, thereby reducing the update frequency of the hotspot data. When a user requests to obtain the restaurant information in the range of 500 meters nearby the Zhichunlu metro station, Haidian district, Beijing, the request of the user may not need to be forwarded to the server of Qianping.com, and it may only need to directly read corresponding restaurant information from the cache area of the background server, to alleviate the pressure under which the server of Qianping.com processes each user request, and further alleviate the processing pressure under which the background server repetitively updates the hotspot data in the area range.

According to the foregoing example embodiments, if the cache area is empty, the method may further include: obtaining, by accessing the third party server, the hotspot data in the area range at which the location information of the user terminal is located; caching the area range and the corresponding hotspot data into the cache area; and setting the expiration time for the hotspot data.

After a query request used by a user to obtain object information and sent by the user terminal is received, if the background server detects that the cache area is empty (for example, when the system just begins to run, or all hotspot data cached in the background server expires and no person execute a query operation after the query request), the background server may forward the query request to the third party server, to obtain the hotspot data in the corresponding area range by accessing the third party server. After the hotspot data returned by the third party server is obtained, the background server may associate the area range and the corresponding hotspot data then cache the area range and the corresponding hotspot data into the cache area, and set the expiration time for the hotspot data.

The implementation manner of the step may be consistent with the implementation manner of step S135 in the foregoing example embodiments and the implementation manner of the steps of "setting a preset expiration time for the hotspot data; and deleting, when time for which the hotspot data is stored in the cache area reaches the expiration time, the hotspot data from the cache area," and details are not described herein again.

In the foregoing example embodiments, if the frequency of query access occurring in the area range does not exceed the predetermined threshold, the method may further include: obtaining, by accessing the third party server, the object information in the area range at which the location information of the user terminal is located; caching the area range and the corresponding object information into the cache area; and setting the expiration time for the object information, where the expiration time of the object information is less than the expiration time of the hotspot data.

If the frequency of query access occurring in the area range does not exceed the predetermined threshold, it may indicate that few users gather in the area range, and the area range may not considered as a hotspot region. Therefore, when the user terminal sends a query request for obtaining the object information in the area range to the background server, the background server may forward the query request to the third party server, and obtain the corresponding object information by accessing the third party server. To prevent another user terminal from querying for the object information in the area range in a short time, the background server may cache the obtained object information and the corresponding area range into its cache area, and set a relatively short expiration time for the object information, to prevent cached data of little use from occupying the storage space of the background server for a long time.

With reference to the foregoing application scenario in which the user terminal is a smartphone and in which an application program installed in the user terminal is a mobile QQ application program, an example in which the third party server is a server of Qianping.com may be used. When a user is located at a relatively remote small town, if few users are in the town, when a user needs to obtain restaurant information nearby the user, the user may send a query request carrying location information (such as longitude and latitude information) of a current place of a mobile phone to the background server by using a mobile QQ application program. After the background server does not find, from the cache area through query, an area range to which the current place of the mobile phone belongs, the background server may forward the query request of the user to the server of Qianping.com for processing. The server of Qianping.com may determine, according to the current place of the mobile phone, the area range to which the current place of the mobile phone belongs, and return all restaurant information in the area range (such as a restaurant name, a distance away from the current place of the mobile phone, whether there is a discounting activity, and a specific restaurant location) to the background server. The background server may associate object information returned by the server of Qianping-.com and the corresponding area range (such as the range of 500 meters nearby XX street, XX town, XX city), and then cache the object information and the corresponding area range into the cache area. After the background server associates the object information returned by the server of Qianping.com and the corresponding area range and caches the object information and the corresponding area range into the cache area, the background server may set a relatively short expiration time for the object information, and the hotspot data may not need to be stored for a long thereby preventing cached data of little use from occupying the storage space of the background server for a long time.

Figure 3:
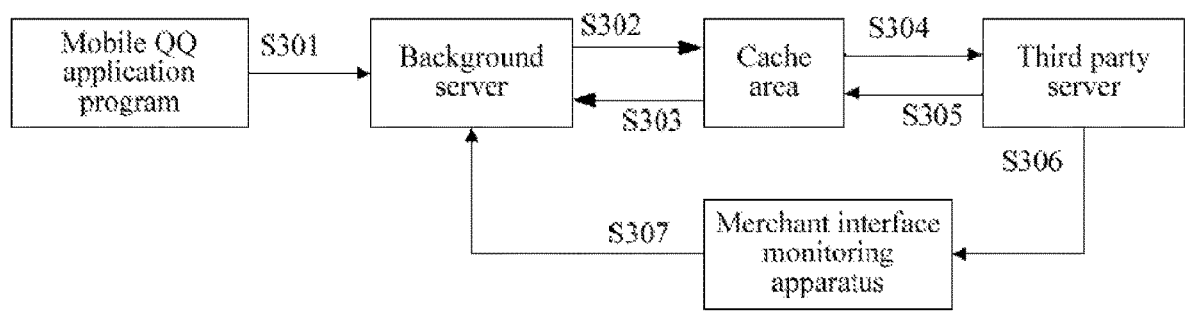
FIG. 3 is a flowchart of a method for obtaining data based on location information according to example embodiments.

FIG. 3 is a flowchart of a method for obtaining data based on location information according to example embodiments. FIG. 3 shows an application scenario in which the user terminal is a smartphone and in which an application program installed in the user terminal is a mobile QQ application program, and an example in which the third party server is a server of Qianping.com. The foregoing example embodiments provide a technical solution, and the method may include the steps below.

Referring to FIG. 3, step S301 includes a user sending a location of the user by using a user terminal, to initiate a query request for obtaining merchant information of a merchant nearby the user. The user terminal may be a mobile QQ application program installed in a smartphone.

When the user holding the smartphone intends to obtain information about a restaurant nearby the user, the user may click "status" in the interface of the mobile QQ application program, select a "food and amusement" option in "status," enter the interface of the "food and amusement" option, and then select "foods" on the top left corner. In this case, the mobile QQ application program may send a query request to the background server according to the option selected by the user and the location information of the mobile phone (such as a specific location of the user).

Step S302 includes, after receiving the query request of the user, the background server querying, according to the location of the user, whether a cache area stores an area range to which the user belongs.

Specifically, the implementation manner of step S302 may be consistent with the implementation manner of step S131 in the foregoing example embodiments, and details are not described herein again.

When it is successfully found through query that the area range to which the user belongs is stored, step S303 is executed; when it is not found through query that the area range to which the user belongs is stored, step S304 is executed.

Step S303 includes the background server reading hotspot data in the area range from the cache area, and returning the hotspot data to the smartphone. The hotspot data may include a shop name of a merchant in the area range, a distance of a merchant away from the user terminal, geographic area information of a merchant, street information of a merchant, longitude and latitude information of a merchant, and whether a merchant has a discounting activity.

The hotspot data may be triggered by the user, an expiration time may be set for the hotspot data at the background, and expired hotspot data may be automatically reconstructed.

The implementation manner of step S303 may be consistent with the implementation manner of step S133 in the foregoing example embodiments, and details are not described herein again.

Step S304 includes the background server forwarding the query request of the user to the third party server, to obtain the corresponding hotspot data by accessing the third party server. The third party server may be the server of Qianping.com.

The implementation manner of step S304 may be consistent with the implementation manner of step S135 in the foregoing example embodiments, and details are not described herein again.

Step S305 includes the third party server returning the corresponding hotspot data to the background server.

In step S305, after the server of Qianping.com returns the corresponding hotspot data to the background server, the background server may cache the hotspot data.

In the process of executing step S305, step S306 may be executed.

Step S306 includes a merchant interface monitoring apparatus monitoring performance of the third party server.

The implementation manner of step S305 may be consistent with the implementation manner of the step of "monitoring an access amount of the third party server" in the foregoing example embodiments, and details are not described herein again.

Step S306 may be executed by using the merchant interface monitoring apparatus on the background server.

When the performance of the server of Qianping.com becomes a bottleneck, that is, an amount of access processed by the server of Qianping.com (that is, a quantity of the foregoing query requests) exceeds the processing capability of the server of Qianping.com, step S307 may be executed.

Step S307 includes the background server dynamically adjusting the length of a first character string code of the area range, and dynamically adjusting the expiration time of the hotspot data. The first character string code may be a GeoHash character string.

The precision of the GeoHash character string and the expiration time of the hotspot data may be dynamically adjusted according to the performance of the server of Qianping.com, and the coverage range of the area range may be adjusted by adjusting the length of the GeoHash character string, thereby adjusting the hit rate of the hotspot data cached in the area range. When the pressure of the background server is relatively large, and in particular, the processing capability of the server of Qianping.com becomes a bottleneck, the length of GeoHash may be dynamically adjusted, to expand the coverage range of the area range. Because the coverage range of the area range becomes larger, and a quantity of users covered by the coverage range also becomes larger, the hit rate of the hotspot data in the area range may be improved. The expiration time of the hotspot data (such as cache timeout and dead time) is dynamically adjusted. When the processing capability of the server of Qianping.com becomes a bottleneck, the processing capability of the server of Qianping.com may be monitored, and the expiration time of the hotspot data of the corresponding area range may be dynamically adjusted, to reduce the processing pressure of the server of Qianping.com.

After step S306 is executed, when the query request initiated by the user is again received, the method may return to execute step S302.

By using the foregoing example embodiments, two-dimensional longitude and latitude data may be converted into a character string according to a precision by using the GeoHash algorithm, to denote a geographic location in a range. The GeoHash algorithm may be used to cache information about a merchant nearby a user. When another user in the range executes a query and search operation, the caching may be hit, to implement low-costs and high-efficiency caching. In addition, by dynamically adjusting the cached area range and the expiration time, pressures of the background server and a server of an external partnership merchant may be alleviated, and a flexible service may be provided to the user.

The foregoing example embodiments are expressed as a series of action combinations for the purpose of brief description, but a person of ordinary skill in the art should know that because some steps may be performed in other sequences or simultaneously according to the example embodiments, the example embodiments are not limited to a described action sequence. In addition, a person skilled in the art should also know that the example embodiments described in this specification are all examples, and therefore, an action and a module involved are not necessarily mandatory in the example embodiments.

Through the descriptions of the preceding example embodiments, persons skilled in the art may understand that the methods according to the example foregoing embodiments may be implemented by hardware only or by software and a necessary universal hardware platform. However, in most cases, software and a necessary universal hardware platform are used. Based on such an understanding, the technical solutions of the example embodiments, or the part contributing to the existing technology, may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the example embodiments.

Figure 13:
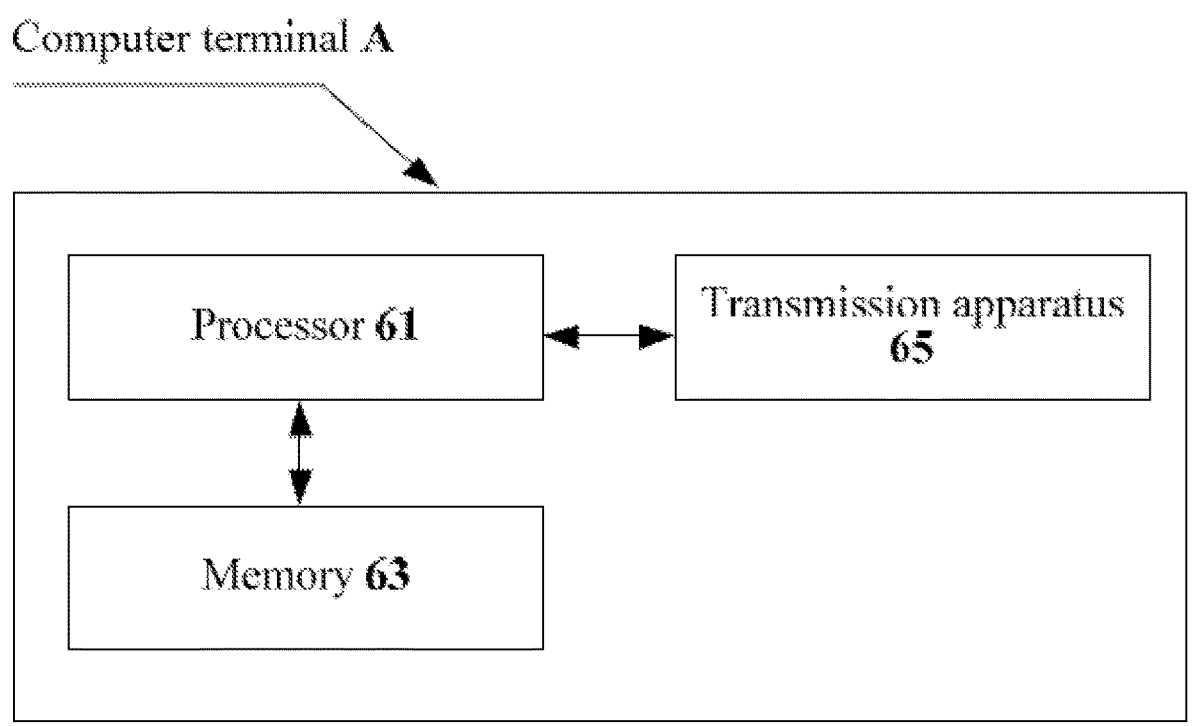
FIG. 13 is a structural block diagram of a computer terminal according to example embodiments.

In an example embodiment, the foregoing methods for obtaining data based on location information may be applied to a hardware environment formed by a computer terminal A shown in FIG. 13. As shown in FIG. 13, the computer terminal A may be connected to another computer terminal by using a network, and the foregoing network may include but is not limited to a wide area network, a metropolitan area network and/or a local area network.

Figure 4:
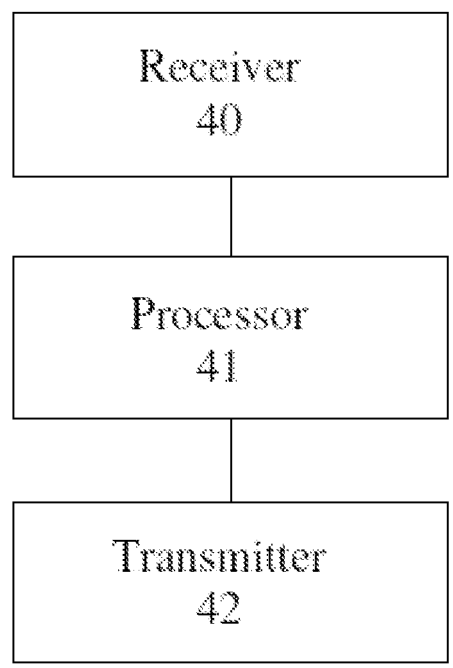
FIG. 4 is a schematic structural diagram of an apparatus for obtaining data based on location information according to example embodiments.

FIG. 4 is a schematic structural diagram of an apparatus for obtaining data based on location information according to example embodiments. As shown in FIG. 4, the apparatus includes a receiver 40, a processor 41 and a transmitter 42.

The receiver 40 may be configured to receive a query request that is used to obtain object information and that is sent by a user terminal, the query request carrying location information of the user terminal.

In an example embodiment, a background server may receive the query request that is used to obtain the object information and that is sent by the user terminal.

The user terminal may be a personal computer or a mobile terminal, such as a smartphone, a notebook computer, or a tablet computer. The foregoing object may be a merchant nearby the user terminal, and the object information may include a distance between a merchant and the user terminal (such as less than 500 meters), geographic area information of a merchant (such as city XX, district XX), street information of a merchant, longitude and latitude information of a merchant, a shop name of a merchant and whether a merchant has a discounting activity.

The merchant may be a restaurant, a cinema, a hotel, a KTV, and/or a scenic spot.

Further, the location information of the user terminal may include at least one type of the following information: longitude and latitude information; street information; geographic area information; and business district information.

In an example embodiment, before the background server receives the query request sent by the user terminal, the user terminal may generate the corresponding query request. The query request may be generated by using an application program installed in the user terminal. When the user holding the user terminal needs to obtain object information (such as, the user needs to obtain information about a restaurant nearby the user), the user may generate, by using the user terminal of the user, the query request carrying the location information of the user terminal. Then, the user terminal may send the query request to the background server, and the background server may receive the query request used to obtain the object information and sent by the user terminal.

The query request may be generated by using an application program installed in the user terminal.

The processor 41 may be configured to query, if a cache area is not empty, the cache area for hotspot data in an area range at which the location information of the user terminal is located, the hotspot data being information about an object included in the area range that is cached when a frequency of query access occurring in the area range exceeds a predetermined threshold.

In an example embodiment, after the query request sent by the user terminal is received, when the cache area of the background server is not empty, the background server may query the cache area for the hotspot data in the area range at which the foregoing location information is located.

The area range may be a range covering a preset geographic section, and the hotspot data of the area range may include object information of all merchants in the coverage range of the area range.

The range covered by the area range may be dynamically adjusted according to needs, specific content may be introduced in subsequent embodiments of this application, and details are not described herein.

In the foregoing example embodiments, the hotspot data may be triggered by the user, and when merchant information corresponding to an area range is queried for a relatively large quantity of times, a hit rate of the merchant information in the area range stored in the cache area may be relatively high, and the area range may be considered as the hotspot data. When a frequency of query access occurring in the area range exceeds a predetermined threshold, that is, a quantity of user terminals that execute a query operation in the area range is relatively large, or a quantity of users that gather in the area range is relatively large, the area range may be determined as a hotspot region, and object information of all objects included in the hotspot region may be cached as the hotspot data in the area range (that is, the hotspot region).

The predetermined threshold may be set according to actual application requirements, and this is not specifically limited in this application.

Figure 5:
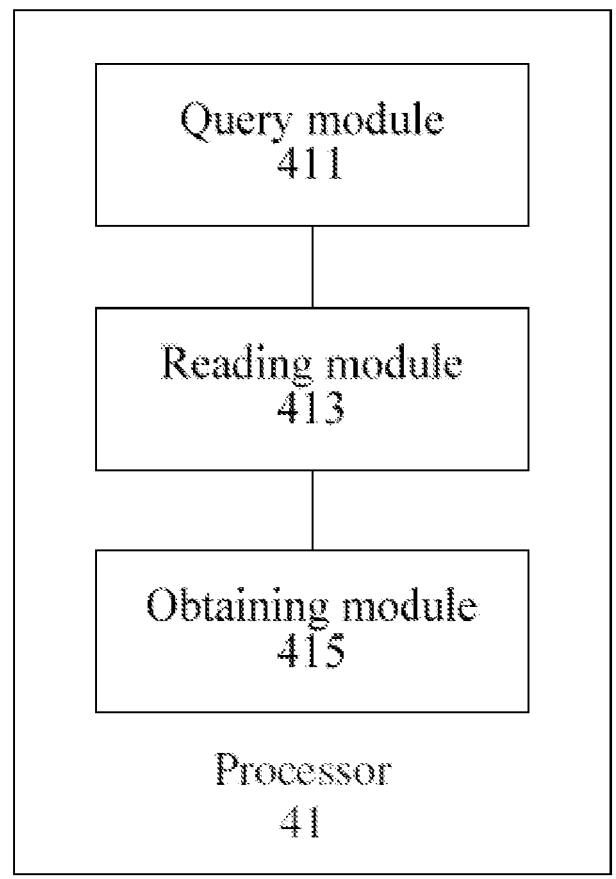
FIG. 5 is a schematic structural diagram of an apparatus for obtaining data based on location information according to example embodiments.

FIG. 5 is a schematic structural diagram of an apparatus for obtaining data based on location information according to example embodiments. As shown in FIG. 5, the processor 41 includes a query module 411, a reading module 413 and an obtaining module 415.

The query module 411 may be configured to query the cache area for the area range at which the location information of the user terminal is located, where the cache area caches at least a preset area range, and the hotspot data in the area range.

After the query request sent by the user terminal is received, the background server may detect whether the cache area is empty. When it is detected that the cache area of the background server is not empty, the cache area may be queried for the area range of the user terminal according to the location information of the user terminal.

The cache area of the background server may cache at least a preset area range and hotspot data in the area range, where the area range and the hotspot data in the area range have an association relationship. When the area range is found through query, the hotspot data in the area range may be read.

The reading module 413 may be configured to read, if the query is successful, the hotspot data in the area range from the cache area.

When the area range of the location information of the user terminal is successfully found through query, that is, the query is successful, the hotspot data in the area range may be read from the cache area.

The obtaining module 415 may be configured to obtain, if the query fails, by accessing a third party server, the hotspot data in the area range at which the location information of the user terminal is located, and cache the area range and the corresponding hotspot data into the cache area.

When the area range at which the location information of the user terminal is located is not found through query, that is, the query fails, the background server may forward the query request sent by the user terminal to the third party server (such as a server of an external partnership merchant) for processing, the hotspot data in the area range at which the location information of the user terminal is located may be obtained by accessing the third party server, and the obtained hotspot data in the area range and the area range may be associated and then cached into the cache area of the background server.

In an example embodiment, after the hotspot data in the area range at which the location information of the user terminal is located is obtained by accessing the third party server, and the area range and the corresponding hotspot data are cached into the cache area, if the query request used to obtain the object information in the area range is again received, the processor 41 and the transmitter 42, may be executed. In a process of executing the processor 41, the hotspot data in the area range may not be obtained again by accessing the third party server, and the hotspot data in the area range may be directly read from the cache area, thereby alleviating a processing pressure of the third party server.

The obtaining the hotspot data in the area range at which the location information of the user terminal is located by accessing the third party server may be implemented by forwarding the query request to the interface of the third party server (such as a merchant interface of the external partnership merchant). A processing capability of the merchant interface of the external partnership merchant may be limited, and therefore, by using the foregoing example embodiments, the pressure of the merchant interface may be greatly alleviated, that is, the processing pressure of the third party server may be alleviated.

Further, after the hotspot data is obtained by accessing the third party server, the obtained hotspot data may be directly returned to the user terminal by using the third party server, and the hotspot data may be returned to the background server, so that the background server caches the hotspot data and the corresponding area range into the cache area. Alternatively, after the background server completes caching, the background server may return the hotspot data to the user terminal.

Referring again to FIG. 4, the transmitter 42 may be configured to send the obtained hotspot data in the area range to the user terminal.

After the hotspot data in the area range at which the location information of the user terminal is located is obtained through query, the hotspot data may be returned to the user terminal.

In an example embodiment, after the query request sent by the user terminal is received, the cache area may be queried, according to the location information of the user terminal carried in the query request, for the hotspot data in the area range at which the location information is located, to send the object information in the area range at which the location information is located to the user terminal. In an example embodiment, by storing, in the cache area, the hotspot data (such as merchant information) of the area range in which many users gather, it may be ensured that when obtaining information about a nearby merchant, most users may find the corresponding hotspot data through query from the cache area. For example, if no user executes a query operation at a remote place, merchant information of the remote place may not be cached, and it may not need to be like the existing technology in which a nationwide covered geographic section is divided according to a fixed range and all merchant information in each section is cached after division, that is, all merchant information in each nationwide section may not need to be wholly stored, to reduce needed storage space, thereby reducing the storage pressure of the background server. In an example embodiment, the technical problem in the existing technology that all merchant information may need to be cached in a background server when information about nearby merchants is searched according to longitude and latitude, occupying relatively large storage space, may be resolved, thereby achieving an effect of reducing occupation of storage space of the background server and reducing the storage pressure of the background server.

Figure 6:
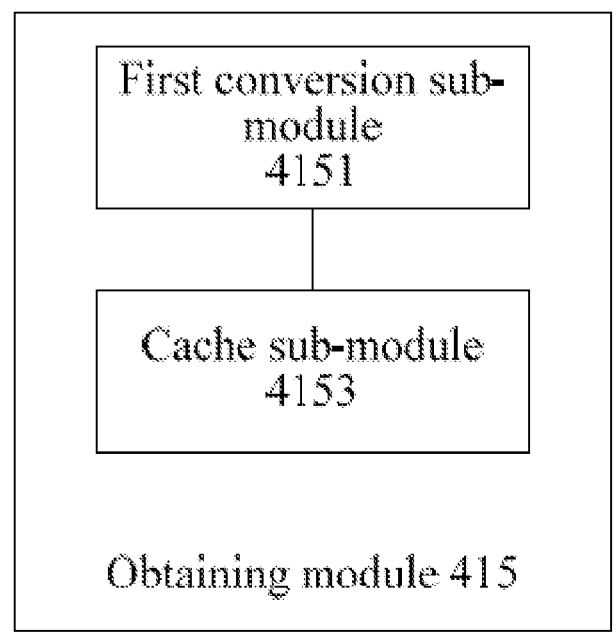
FIG. 6 is a schematic structural diagram of an apparatus for obtaining data based on location information according to example embodiments.

FIG. 6 is a schematic structural diagram of an apparatus for obtaining data based on location information according to example embodiments. As shown in FIG. 6, the obtaining module 415 includes a first conversion sub-module 4151 and a cache sub-module 4153.

The first conversion sub-module may be configured to convert two-dimensional longitude and latitude data used to denote the area range into a one-dimensional first character string code.

After the hotspot data in the area range at which the location information of the user terminal is located is obtained by accessing the third party server, the background server may convert the two-dimensional longitude and latitude data used to denote the area range into the one-dimensional first character string code.

In an example embodiment, a two-dimensional longitude and latitude data may be converted, by using the GeoHash algorithm, into a one-dimensional character string code that can be sorted and compared, and each character string code may denote an area range. When the length of a GeoHash character string code is a longer, precision of an area range denoted by the GeoHash character string code may be higher. For example, when the length of a GeoHash character string code is 8, precision of an area range denoted by the GeoHash character string code may be approximately 19 meters, and when the length of a GeoHash character string code is 9, precision of an area range denoted by the GeoHash character string code may be approximately 2 meters. The length of a character string code may be selected according to a data status.

The cache sub-module may be configured to associate the first character string code and the obtained hotspot data in the area range, and then cache the first character string code and the obtained hotspot data in the area range into the cache area.

After the background server converts the two-dimensional longitude and latitude data used to denote the area range into the one-dimensional first character string the first character string code and the obtained hotspot data in the area range may be associated and then cached into the cache area of the background server.

Similar GeoHash character strings may denote close distances, and in this way, nearby merchant information may be queried by using prefix matching between GeoHash character strings.

By using the foregoing example embodiments, because two-dimensional longitude and latitude data is converted into a one-dimensional first character string code, the area range denoted by the first character string code may be adjusted by conveniently adjusting the length of the first character string code and according to the frequency of query access occurring in the area range, that is, the geographic range covered by the area range may be conveniently adjusted, to resolve a problem in the existing technology that a section is divided according to a fixed range, and when the size of the section is updated, the update operation is cumbersome and the update efficiency is low, thereby adjusting the size of the area range conveniently, rapidly, and dynamically.

Figure 7:
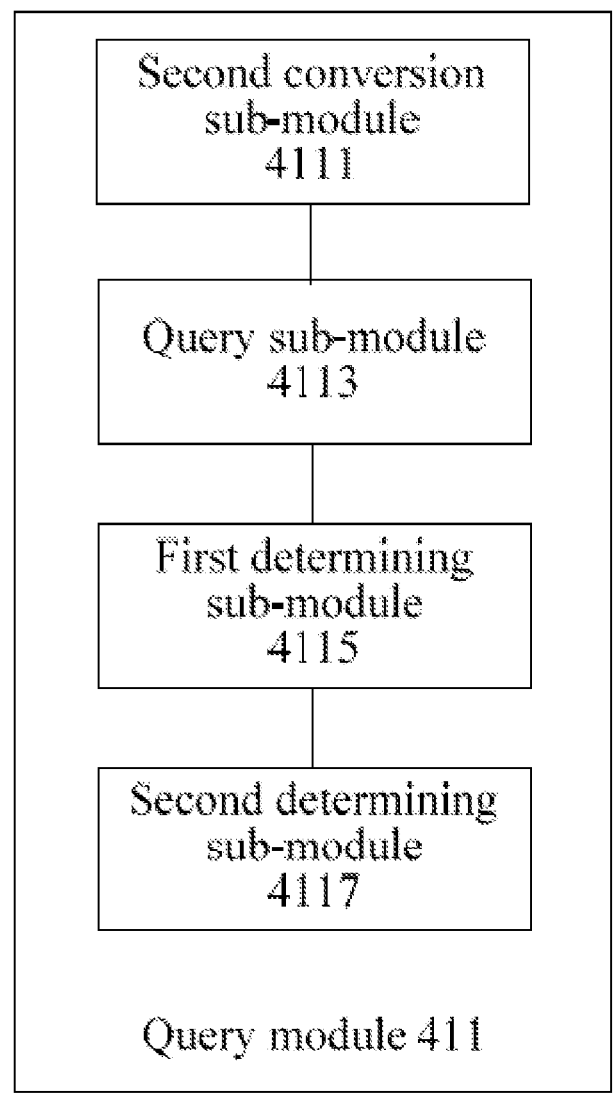
FIG. 7 is a schematic structural diagram of an apparatus for obtaining data based on location information according to example embodiments.

FIG. 7 is a schematic structural diagram of an apparatus for obtaining data based on location information according to example embodiments. As shown in FIG. 7, the query module 411 includes a second conversion sub-module 4111, a query sub-module 4113, a first determining sub-module 4115 and a second determining sub-module 4117.

The second conversion sub-module 4111 may be configured to convert longitude and latitude data in the location information of the user terminal into a second character string code that the cache area can identify.

When the cache area of the background server is not empty, the longitude and latitude data in the location information of the user terminal carried in the received query request may be converted into a second character string code that the cache area can identify.

The query sub-module 4113 may be configured to query whether the cache area stores the first character string code the same as the second character string code.

Whether the cache area of the background server stores the first character string code the same as the second character string code may be queried.

When the longitude and latitude data of the user terminal falls within an area range, a GeoHash character string (that is, the foregoing second character string code) obtained by converting the longitude and latitude data of the user terminal by using the GeoHash algorithm may be the same as a GeoHash character string (that is, the foregoing first character string code) obtained by converting, by using the GeoHash algorithm, the longitude and latitude data used to denote the area range. If the first character string code the same as the second character string code is found through query from the cache area, it may denote that the cache area stores the hotspot data of the area range, and in this case it may be determined that the area range is successfully found through query. If the first character string code that is the same as the second character string code is not found through query from the cache area, it may denote that the cache area does not store the hotspot data of the area range, and in this case it may be determined that the query of the area range fails.

The first determining sub-module 4115 may be configured to determine, if the cache area stores the first character string code the same as the second character string code, that the area range is successfully found through query.

If the area range is successfully found through query, the hotspot data in the area range is read from the cache area, the implementation manner of the first determining sub-module may be consistent with the implementation manner of the reading module 413 in the foregoing example embodiments, and details are not described herein again.

The second determining sub-module 4117 may be configured to determine, if the cache area does not store the first character string code the same as the second character string code, that the area range is unsuccessfully queried.

If the query of the area range fails, the hotspot data in the area range at which the location information of the user terminal is located may be obtained by accessing the third party server, and the area range and the corresponding hotspot data may be cached into the cache area. The implementation manner of the second determining sub-module may be consistent with the implementation manner of the obtaining module 415 in the foregoing example embodiments, and details are not described herein again.

By using the foregoing example embodiments, when merchant information nearby the user terminal is queried according to the location of the user terminal, it may be only needed to convert the longitude and latitude data of the location of the user terminal into a one-dimensional Geo-Hash character string, and perform prefix matching between the one-dimensional GeoHash character string and a GeoHash character string of each area range stored in the cache area. When the GeoHash character string of the area range is the same as the GeoHash character string of the location of the user terminal, it may be determined that the cache area stores the area range of the location of the user terminal, the query may be convenient and quick, and the query efficiency may be high.

Figure 8:
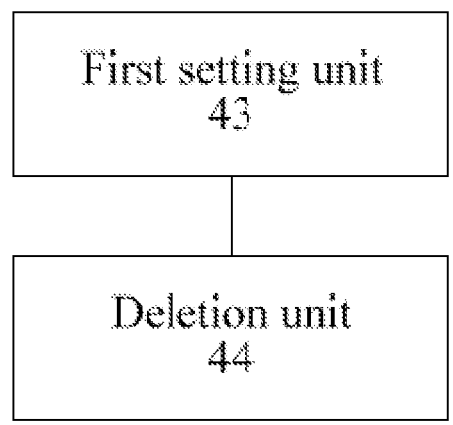
FIG. 8 is a schematic structural diagram of an apparatus for obtaining data based on location information according to example embodiments.

FIG. 8 is a schematic structural diagram of an apparatus for obtaining data based on location information according to example embodiments. As shown in FIG. 8, the foregoing apparatus (e.g., of FIG. 4) further includes a first setting unit 43 and a deletion unit 44.

The first setting unit 43 may be configured to set, at the same time of or after the associating the first character string code and the obtained hotspot data in the area range and then caching the first character string code and the obtained hotspot data in the area range into the cache area, a preset expiration time for the hotspot data, where the expiration time is determined according to a frequency at which the hotspot data is queried.

The deletion unit 44 may be configured to delete, when time for which the hotspot data is stored in the cache area reaches the expiration time, the hotspot data from the cache area.

At the same time when or after the obtained hotspot data and a first character string that is used to denote the corresponding area range are associated by using the third party server and cached into the cache area, a preset expiration time may be set for the hotspot data. When time for which the hotspot data is stored in the cache area reaches the expiration time, the hotspot data may be deleted from the cache area, to achieve an effect of updating the hotspot data in time.

In an example embodiment, after hotspot data in an area range reaches an expiration time of the hotspot data and is deleted, if the background server again receives the query request used to obtain the object information in the area range, it may be needed to return to execute the receiver 40 to the transmitter 42. In this case, because the background server does not store the hotspot data in the area range, the corresponding hotspot data may be obtained by accessing the third party server. Therefore, the length of the expiration time may be related to the processing pressure of the third party server, and if the expiration time is relatively short, the third party server may need to process the query request of the user terminal for multiple times. Consequently, the processing capability of the third party server may become a bottleneck of the entire system, the query efficiency may be affected, the query request sent by the user terminal cannot be processed in time, a user wait time may be long, and user experience may be poor. If the expiration time is relatively long, merchant information in the area range cannot be updated in time.

The expiration time may be determined according to the frequency of querying for the hotspot data, that is, determined according to the hit rate of the hotspot data.

In an example embodiment of this application, when the query request sent by the user terminal is to request to obtain object information in an area range, the cache area may store hotspot data in the area range. In this case, it may indicate that the hotspot data is hit, and a larger quantity of times of hitting the hotspot data may indicate a higher hit rate of the hotspot data.

In an example embodiment, when one or more merchants in an area range perform a discounting activity, more users may be attracted in a short time to execute a query operation in the area range. In this case, a relatively long expiration time such as 1 day or 2 days may be set for hotspot data in the area range, to prevent the hotspot data in the area from being repetitively updated in a short time, so as not to cause a large processing pressure to the background server and the third party server.

By using the foregoing example embodiments, setting the expiration time for the hotspot data may ensure that merchant information in the corresponding area range is updated in time and effectively, to provide recent merchant information to the user. For example, when a merchant is added or a merchant discounting activity is added, related information may be provided to the user in time.

Figure 9:
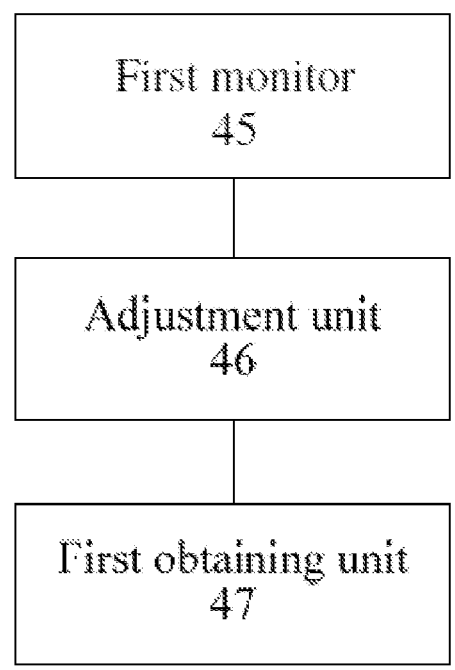
FIG. 9 is a schematic structural diagram of an apparatus for obtaining data based on location information according to example embodiments.

FIG. 9 is a schematic structural diagram of an apparatus for obtaining data based on location information according to example embodiments. As shown in FIG. 9, the foregoing apparatus (e.g., of FIG. 4) further includes a first monitor 45, an adjustment unit 46 and a first obtaining unit 47.

The first monitor 45 may be configured to monitor, during the querying the cache area for the area range at which the location information of the user terminal is located, a quantity of query times of querying the cache area for the same area range.

The adjustment unit 46 may be configured to adjust, when it is monitored that the quantity of query times of querying the cache area for the same area range exceeds a preset query threshold, precision of the first character string code to expand a coverage range of the queried area range, and obtain an adjusted area range.

The first obtaining unit 47 may be configured to obtain, after a query request used to obtain object information in the adjusted area range is received, hotspot data in the adjusted area range by accessing the third party server, and cache the adjusted area range and the corresponding hotspot data into the cache area.

A quantity of query times of querying the cache area for the same area range may be monitored, that is, the hit rate of each hotspot data in the cache area is monitored. When it is monitored that the quantity of query times of querying the cache area for the same area range exceeds a preset query threshold, it may indicate that more users in the area range execute a query operation. If more users at an external edge of the area range also query for object information, the users at the external edge may not hit the hotspot data in the area range. In this case, the processing pressure of the third party server may be excessively large, the query request sent by the user terminal cannot be processed in time, a user wait time may be long, and user experience may be poor. Therefore, when it is monitored that the quantity of query times of querying the cache area for the same area range exceeds a preset query threshold, the precision of the first character string code may be reduced by shortening the length of the first character string code, to expand a coverage range of the queried area range, and an adjusted area range may be obtained. The adjusted area range may cover a larger geographic range.

Further, after the adjusted area range is obtained, and after the query request used to obtain object information in the adjusted area range is received, the hotspot data of the adjusted area range may be obtained by accessing the third party server, and the adjusted area range and the corresponding hotspot data may be associated and then cached into the cache area. Its implementation manner may be consistent with the implementation manner of the obtaining module 415 in the foregoing example embodiments, and details are not described herein again.

In an example embodiment, after the hotspot data in the adjusted area range is located is obtained by accessing the third party server, and the adjusted area range and the corresponding hotspot data are associated and then cached into the cache area, if the query request used to obtain the object information in the adjusted area range is again received, the processor 41 and the transmitter 42 may be executed, where in a process of executing the processor 41, the hotspot data in the area range may not need to be obtained again by accessing the third party server, and the hotspot data in the area range may be directly read from the cache area, thereby alleviating a processing pressure of the third party server.

The obtaining the hotspot data in the adjusted area range by accessing the third party server may be implemented by forwarding the query request to the interface of the third party server (such as a merchant interface of the external partnership merchant). A processing capability of the merchant interface of the external partnership merchant may be limited, and therefore, by using the foregoing example embodiments, the pressure of the merchant interface may be greatly alleviated, and the processing pressure of the third party server may be alleviated.

Figure 10:
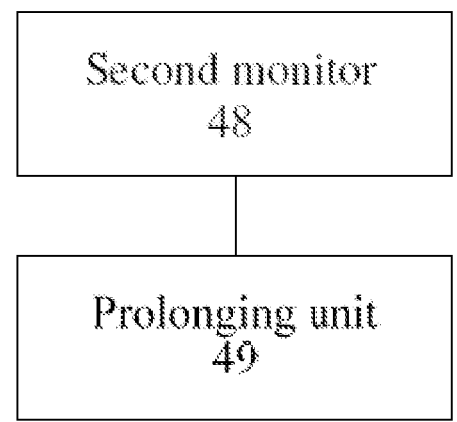
FIG. 10 is a schematic structural diagram of an apparatus for obtaining data based on location information according to example embodiments.

FIG. 10 is a schematic structural diagram of an apparatus for obtaining data based on location information according to example embodiments. As shown in FIG. 10, the foregoing apparatus (e.g., of FIG. 4) further includes a second monitor 48 and a prolonging unit 49.

The second monitor 48 may be configured to monitor, during the obtaining, by accessing a third party server, the hotspot data in the area range at which the location information of the user terminal is located, an access amount of the third party server.

The prolonging unit 49 may be configured to prolong, if the access amount of the third party server exceeds a preset access threshold, the expiration time of the hotspot data according to the access amount.

During the obtaining, by accessing a third party server, the hotspot data in the area range at which the location information of the user terminal may be located. Because the processing capability of the third party server is limited, to prevent the processing capability of the third party server from causing a system processing bottleneck, and prevent the user from waiting for a long time to reduce user experience, an access amount of the third party server may be monitored, that is, a quantity of query requests processed by the third party server may be monitored. When it is monitored that the access amount of the third party server exceeds a preset access threshold, it may be considered that in this case, the processing capability of the third party server may reach the limit, and the third party server cannot continue to process other query requests in time. To alleviate the pressure of the third party server, the expiration time of the corresponding hotspot data may be prolonged according to the size of the access amount, and by preventing the hotspot data from being repetitively updated in a short time, the processing pressure of the third party server may be reduced.

Figure 11:
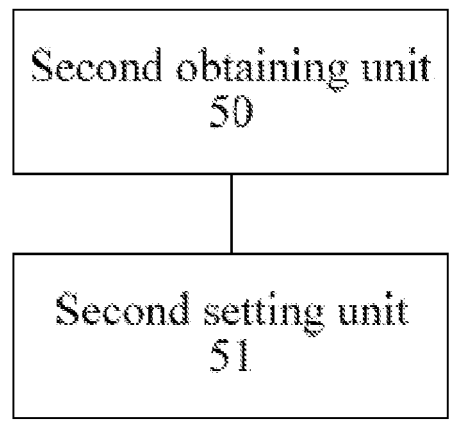
FIG. 11 is a schematic structural diagram of an apparatus for obtaining data based on location information according to example embodiments.

FIG. 11 is a schematic structural diagram of an apparatus for obtaining data based on location information according to example embodiments. As shown in FIG. 11, the foregoing apparatus (e.g., of FIG. 4) further includes a second obtaining unit 50 and a second setting unit 51.

The second obtaining unit 50 may be configured to obtain, if the cache area is empty, by accessing the third party server, the hotspot data in the area range at which the location information of the user terminal is located, and cache the area range and the corresponding hotspot data into the cache area.

The second setting unit 51 may be configured to set the expiration time for the hotspot data.

After a query request used by a user to obtain object information and sent by the user terminal is received, if the background server detects that the cache area is empty (for example, when the system just begins to run, or all hotspot data cached in the background server expires and no person execute a query operation after the query request), the background server may forward the query request to the third party server, to obtain the hotspot data in the corresponding area range by accessing the third party server. After the hotspot data returned by the third party server is obtained, the background server may associate the area range and the corresponding hotspot data and then caches the area range and the corresponding hotspot data into the cache area, and set the expiration time for the hotspot data.

The implementation manner of the foregoing example embodiments may be consistent with the implementation manner of the obtaining module 415 in the foregoing example embodiments and the implementation manner of the first setting unit and the deletion unit, and details are not described herein again.

Figure 12:
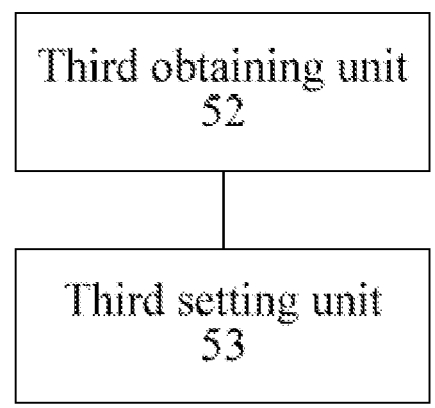
FIG. 12 is a schematic structural diagram of an apparatus for obtaining data based on location information according to example embodiments.

FIG. 12 is a schematic structural diagram of an apparatus for obtaining data based on location information according to example embodiments. As shown in FIG. 12, the foregoing apparatus (e.g., of FIG. 4) further includes a third obtaining unit 52 and a third setting unit 53.

The third obtaining unit 52 may be configured to obtain, if the frequency of query access occurring in the area range exceeds the predetermined threshold, by accessing the third party server, object information in the area range at which the location information of the user terminal is located, and cache the area range and the corresponding object information into the cache area.

The third setting unit 53 may be configured to set the expiration time for the object information, where the expiration time of the object information is less than the expiration time of the hotspot data.

If the frequency of query access occurring in the area range does not exceed the predetermined threshold, it may indicate that few users gather in the area range, and the area range may not considered as a hotspot region. Therefore, when the user terminal sends a query request for obtaining the object information in the area range to the background server, the background server may forward the query request to the third party server, and obtain the corresponding object information by accessing the third party server. To prevent another user terminal from querying for the object information in the area range in a short time, the background server may cache the obtained object information and the corresponding area range into its cache area, and set a relatively short expiration time for the object information, to prevent cached data of little use from occupying the storage space of the background server for a long time.

In an example embodiment, the foregoing apparatus for obtaining data based on location information may be applied to a hardware environment formed by a computer terminal A shown in FIG. 13. As shown in FIG. 13, the computer terminal A may be connected to another computer terminal by using a network, and the foregoing network may include but is not limited to: a wide area network, a metropolitan area network or a local area network.

In an example embodiment, a computer terminal may be provided, and the computer terminal may be any computer terminal device in a computer terminal group. In an example embodiment, the foregoing computer terminal may be replaced with a terminal device such as a mobile terminal.

In an example embodiment, the foregoing computer terminal may be located in at least one of multiple network devices in a computer network.

FIG. 13 is a structural block diagram of a computer terminal according to example embodiments. As shown in FIG. 13, the computer terminal A includes one or more (only one is shown in the figure) processors 61, a memory 63, and a transmission apparatus 65.

The memory 63 may be configured to store a software program and a module such as a program instruction/module corresponding to the method and apparatus for obtaining data based on location information in the embodiments of this application, and the processor 61 runs the software program and the module stored in the memory 63, to execute various function applications and data processing, that is, implement the foregoing method for obtaining data based on location information. The memory 63 may include a high-speed random memory, and may also include a nonvolatile memory, for example, one or more magnetic storage devices, flash memories or other nonvolatile solid-state memories. In some embodiments, the memory 63 may further include memories remotely disposed relative to the processor 61, and these remote memories may be connected to the terminal A through a network. Examples of the network include but are not limited to, the Internet, an intranet, a local area network, a mobile communications network, or a combination thereof.

The foregoing transmission apparatus 66 is configured to receive or send data through a network. Specific examples of the foregoing network may include a wired network and a wireless network. In an example, the transmission apparatus 66 includes a network interface controller (NIC) that may be connected to another network device and a router by using a network cable, thereby communicating with the Internet or a local area network. In an example, the transmission apparatus 66 is a radio frequency (RF) module that is configured to communicate with the Internet in a wireless manner.

Specifically, the memory 63 is configured to store information about a preset action condition and a preset privileged user, and an application program.

The processor 61 may invoke, by using the transmission apparatus, the information and the application program stored in the memory 63, to execute the following steps: receiving a query request that is used to obtain object information and that is sent by a user terminal, the query request carrying location information of the user terminal; querying, if a cache area is not empty, the cache area for hotspot data in an area range at which the location information of the user terminal is located, the hotspot data being information about an object included in the area range that is cached when a frequency of query access occurring in the area range exceeds a predetermined threshold; and sending the obtained hotspot data in the area range to the user terminal.

The foregoing processor 61 may further execute program code for the following steps: querying the cache area for the area range at which the location information of the user terminal is located, where the cache area caches at least a preset area range, and the hotspot data in the area range; reading, if the query is successful, the hotspot data in the area range from the cache area; and obtaining, if the query fails, by accessing a third party server, the hotspot data in the area range at which the location information of the user terminal is located, and caching the area range and the corresponding hotspot data into the cache area.

The foregoing processor 61 may further execute program code for the following steps: converting two-dimensional longitude and latitude data used to denote the area range into a one-dimensional first character string code; and associating the first character string code and the obtained hotspot data in the area range and then caching the first character string code and the obtained hotspot data in the area range into the cache area.

The foregoing processor 61 may further execute program code for the following steps: converting longitude and latitude data in the location information of the user terminal into a second character string code that the cache area can identify; querying whether the cache area stores the first character string code the same as the second character string code; determining, if the cache area stores the first character string code the same as the second character string code, that the area range is successfully found through query; and determining, if the cache area does not store the first character string code the same as the second character string code, that the area range is unsuccessfully queried.

The foregoing processor 61 may further execute program code for the following steps: setting a preset expiration time for the hotspot data, where the expiration time is determined according to a frequency at which the hotspot data is queried; and deleting, when time for which the hotspot data is stored in the cache area reaches the expiration time, the hotspot data from the cache area.

The foregoing processor 61 may further execute program code for the following steps: monitoring a quantity of query times of querying the cache area for the same area range; adjusting, when it is monitored that the quantity of query times of querying the cache area for the same area range exceeds a preset query threshold, precision of the first character string code to expand a coverage range of the queried area range, and obtaining an adjusted area range; and obtaining, after a query request used to obtain object information in the adjusted area range is received, hotspot data in the adjusted area range by accessing the third party server, and caching the adjusted area range and the corresponding hotspot data into the cache area.

The foregoing processor 61 may further execute program code for the following steps: monitoring an access amount of the third party server; and prolonging, if the access amount of the third party server exceeds a preset access threshold, the expiration time of the hotspot data according to the access amount.

The foregoing processor 61 may further execute program code for the following steps: obtaining, by accessing the third party server, the hotspot data in the area range at which the location information of the user terminal is located, and caching the area range and the corresponding hotspot data into the cache area; and setting the expiration time for the hotspot data.

The foregoing processor 61 may further execute program code for the following steps: obtaining, by accessing the third party server, the object information in the area range at which the location information of the user terminal is located, and caching the area range and the corresponding object information into the cache area; and setting the expiration time for the object information, where the expiration time of the object information is less than the expiration time of the hotspot data.

Persons of ordinary skill in the art may understand that, the structure shown in FIG. 13 is only schematic. Alternatively, the computer terminal may be a terminal device such as a smartphone (such as an Android mobile phone or an iOS mobile phone), a tablet computer, a palmtop computer, a mobile Internet device (MID), or a PAD. FIG. 13 does not limit the structure of the foregoing electronic apparatus. For example, the computer terminal 10 may further include more or less components (such as a network interface and a display apparatus) than those shown in FIG. 13, or has a configuration different from that shown in FIG. 13.

Persons of ordinary skill in the art may understand that all or a part of the steps of the methods of the foregoing embodiments may be implemented by a program instructing relevant hardware of the terminal device. The program may be stored in a computer readable storage medium. The storage medium may be a flash disk, a read-only memory (ROM), a random access memory (RAM), a magnetic disk, or an optical disc.

In an example embodiment, a storage medium may be provided. In an example embodiment, the foregoing storage medium may store the program code of the method for obtaining data based on location information of the foregoing example embodiments.

In an example embodiment, the foregoing storage medium 902 may be located in at least one of multiple network devices in a computer network.

In an example embodiment, the storage medium 902 is set to store program code used to execute the following steps: receiving a query request that is used to obtain object information and that is sent by a user terminal, the query request carrying location information of the user terminal; querying, if a cache area is not empty, the cache area for hotspot data in an area range at which the location information of the user terminal is located, the hotspot data being information about an object included in the area range that is cached when a frequency of query access occurring in the area range exceeds a predetermined threshold; and sending the obtained hotspot data in the area range to the user terminal.

The storage medium is further set to store program code used to execute the following steps: querying the cache area for the area range at which the location information of the user terminal is located, where the cache area caches at least a preset area range, and the hotspot data in the area range; reading, if the query is successful, the hotspot data in the area range from the cache area; and obtaining, if the query fails, by accessing a third party server, the hotspot data in the area range at which the location information of the user terminal is located, and caching the area range and the corresponding hotspot data into the cache area.

The storage medium is further set to store program code used to execute the following steps: converting two-dimensional longitude and latitude data used to denote the area range into a one-dimensional first character string code; and associating the first character string code and the obtained hotspot data in the area range and then caching the first character string code and the obtained hotspot data in the area range into the cache area.

The storage medium is further set to store program code used to execute the following steps: converting longitude and latitude data in the location information of the user terminal into a second character string code that the cache area can identify; querying whether the cache area stores the first character string code the same as the second character string code; determining, if the cache area stores the first character string code the same as the second character string code, that the area range is successfully found through query; and determining, if the cache area does not store the first character string code the same as the second character string code, that the area range is unsuccessfully queried.

The storage medium is further set to store program code used to execute the following steps: setting a preset expiration time for the hotspot data, where the expiration time is determined according to a frequency at which the hotspot data is queried; and deleting, when time for which the hotspot data is stored in the cache area reaches the expiration time, the hotspot data from the cache area.

The storage medium is further set to store program code used to execute the following steps: monitoring a quantity of query times of querying the cache area for the same area range; adjusting, when it is monitored that the quantity of query times of querying the cache area for the same area range exceeds a preset query threshold, precision of the first character string code to expand a coverage range of the queried area range, and obtaining an adjusted area range; and obtaining, after a query request used to obtain object information in the adjusted area range is received, hotspot data in the adjusted area range by accessing the third party server, and caching the adjusted area range and the corresponding hotspot data into the cache area.

The storage medium is further set to store program code used to execute the following steps: monitoring an access amount of the third party server; and prolonging, if the access amount of the third party server exceeds a preset access threshold, the expiration time of the hotspot data according to the access amount.

The storage medium is further set to store program code used to execute the following steps: obtaining, by accessing the third party server, the hotspot data in the area range at which the location information of the user terminal is located, and caching the area range and the corresponding hotspot data into the cache area; and setting the expiration time for the hotspot data.

The storage medium is further set to store program code used to execute the following steps: obtaining, by accessing the third party server, the object information in the area range at which the location information of the user terminal is located, and caching the area range and the corresponding object information into the cache area; and setting the expiration time for the object information, where the expiration time of the object information is less than the expiration time of the hotspot data.

In an example embodiment, the foregoing storage medium may include but is not limited to: any medium that can store program code, such as a USB flash drive, a read-only memory (ROM), a random access memory (RAM), a removable hard disk, a magnetic disk, or an optical disc.

The sequence numbers of the preceding embodiments of this application are for description purpose but do not indicate the preference of the embodiments.

When the integrated unit in the foregoing embodiment is implemented in a form of a software functional module and sold or used as an independent product, the integrated unit may be stored in the foregoing computer-readable storage medium. Based on such an understanding, the technical solutions of the embodiments of this application, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this application.

In the foregoing embodiments of this application, descriptions of the embodiments have different emphases, and as for parts that are not described in detail in one embodiment, reference can be made to the relevant description of the other embodiments.

In the several embodiments provided in the present application, the disclosed client may be implemented in other manners. The described apparatus embodiments are examples. For example, the unit division is a logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in the form of hardware, or may be implemented in the form of a software functional unit.

The above descriptions are example embodiments of this application, and a person of ordinary skill in the art may make various improvements and refinements without departing from the spirit of this application. All such modifications and refinements are also intended to be covered by this application.

What is claimed is:

1. A method for obtaining data, based on location information, the method comprising:
   receiving, by a server, from a remote querying user terminal, a first query request that is used to obtain object information, the first query request carrying location information of the remote querying user terminal;
   determining, by the server, a frequency of user terminals executing a query operation in an area range in which the location information of the remote querying user terminal is located;
   querying, by the server, in response to a cache area being not empty, the cache area for hotspot data in the area range, the hotspot data being information of an object comprised in the area range, and the hotspot data being cached in response to the frequency of the user terminals executing the query operation in the area range exceeding a predetermined threshold number; and
   sending, by the server, to the remote querying user terminal, the hotspot data in the area range,
   wherein the querying the cache area comprises:
      querying the cache area for the area range in which the location information of the remote querying user terminal is located, the cache area caching at least a preset area range, and for the hotspot data in the area range;
      reading, in response to the querying the cache area being successful, the hotspot data in the area range, from the cache area; and
      in response to the querying the cache area failing, obtaining, from a third party server, the hotspot data in the area range, and caching the area range and the hotspot data in the area range, into the cache area,
   wherein the caching the area range and the hotspot data in the area range comprises:
      converting two-dimensional longitude and latitude data that is used to denote the area range into a one-dimensional first character string code;
      associating the first character string code and the hotspot data that is obtained; and
      caching the first character string code associated with the hotspot data that is obtained, into the cache area, and
   wherein the querying the cache area further comprises:
      converting longitude and latitude data in the location information of the remote querying user terminal, into a second character string code;
      querying whether the cache area stores the first character string code that is same as the second character string code;
      in response to a determination that the first character sting code is the same as the second character string code, storing the area range in the cache and determining that the area range is successfully found through query; and
      determining, in response to a determination that the first character sting code is different than the second character string code, that the area range is unsuccessfully queried.

2. The method according to claim 1, further comprising:
   setting, by the server, a first expiration time for the hotspot data that is obtained, the first expiration time being determined based on a frequency at which the hotspot data is queried; and
   deleting, by the server, in response to a time for which the hotspot data is stored in the cache area reaching the first expiration time, the hotspot data, from the cache area.

3. The method according to claim 1, further comprising, during the querying the cache area:
   monitoring a quantity of query times of querying the cache area for the area range;
   adjusting, in response to the quantity of query times of querying the cache area for the area range being monitored to exceed a preset query threshold, precision of the first character string code to expand a coverage range of the area range that is queried, to obtain an adjusted area range; and
   in response to receiving a second query request that is used to obtain object information in the adjusted area range, obtaining hotspot data in the adjusted area range, from the third party server, and caching the adjusted area range and the hotspot data in the adjusted area range, into the cache area.

4. The method according to claim 2, further comprising, during the obtaining the hotspot data in the area range:
   monitoring an access amount of the third party server; and
   prolonging, in response to the access amount of the third party server being monitored to exceed a preset access threshold, the first expiration time of the hotspot data, based on the access amount.

5. The method according to claim 2, further comprising, in response to the cache area being empty:
   obtaining, from the third party server, the hotspot data in the area range in which the location information of the remote querying user terminal is located;
   caching the area range and the hotspot data that is obtained, into the cache area; and
   setting the first expiration time for the hotspot data that is obtained.

6. The method according to claim 2, further comprising, in response to the frequency of the user terminals executing the query operation occurring in the area range not exceeding the predetermined threshold:
   obtaining, from the third party server, object information in the area range in which the location information of the remote querying user terminal is located;
   caching the area range and the object information that is obtained, into the cache area; and
   setting a second expiration time for the object information, the second expiration time for the object information being less than the first expiration time of the hotspot data.

7. A server for obtaining data based on location information, the server comprising:
   at least one memory configured to store computer program code;
   a receiver configured to receive, from a remote querying user terminal, a query request that is used to obtain object information, the query request carrying location information of the remote querying user terminal;
   at least one processor configured to access the at least one memory and operate as instructed by the computer program code, the computer program code comprising:
      first determining code configured to determine a frequency of user terminals executing a query operation in an area range in which the location information of the remote querying user terminal is located;
      first query code configured to query, in response to a cache area being not empty, the cache area for hotspot data in the area range, the hotspot data being information of an object comprised in the area range, and the hotspot data being cached in response to the frequency of the user terminals executing the query operation in the area range exceeding a predetermined threshold number;
      second query code configured to query the cache area for the area range in which the location information of the remote querying user terminal is located, the cache area caching at least a preset area range, and for the hotspot data in the area range;
      first reading code configured to read, in response to the querying the cache area being successful, the hotspot data in the area range, from the cache area;
      first obtaining code configured to, in response to the querying the cache area failing, obtain, from a third party server, the hotspot data in the area range and cache the area range and the hotspot data in the area range, into the cache area;
      first conversion code configured to convert two-dimensional longitude and latitude data that is used to denote the area range into a one-dimensional first character string code;
      first cache code configured to associate the first character string code and the hotspot data that is obtained, and cache the first character string code associated with the hotspot data that is obtained, into the cache area;
      second conversion code configured to convert longitude and latitude data in the location information of the remote querying user terminal, into a second character string code;
      third query code configured to query whether the cache area stores the first character string code that is same as the second character string code;
      second determining code configured to, in response to a determination that the first character sting code is the same as the second character string code, store the area range in the cache and determine that the area range is successfully found through query; and
      third determining code configured to determine, in response to a determination that the first character sting code is different than the second character string code, that the area range is unsuccessfully queried; and
   a transmitter configured to send, to the remote querying user terminal, the hotspot data in the area range.

8. The server according to claim 7, wherein the computer program code further comprises:
   first setting code configured to cause the at least one processor to set a first expiration time for the hotspot data that is obtained, the first expiration time being determined based on a frequency at which the hotspot data is queried; and
   first deletion code configured to cause the at least one processor to delete, in response to a time for which the hotspot data is stored in the cache area reaching the first expiration time, the hotspot data, from the cache area.

9. The server according to claim 7, wherein the computer program code further comprises:
   first monitor code configured to cause the at least one processor to monitor, during the querying the cache area, a quantity of query times of querying the cache area for the area range;
   first adjustment code configured to cause the at least one processor to adjust, in response to the quantity of query times of querying the cache area for the area range being monitored to exceed a preset query threshold, precision of the first character string code to expand a coverage range of the area range that is queried, to obtain an adjusted area range; and
   first obtaining code configured to cause the at least one processor to in response to receiving a second query request that is used to obtain object information in the adjusted area range, obtain hotspot data in the adjusted area range, from the third party server, and caching the adjusted area range and the hotspot data in the adjusted area range, into the cache area.

10. The server according to claim 8, wherein the computer program code further comprises:
   second monitor code configured to cause the at least one processor to monitor, during the obtaining the hotspot data in the area range, an access amount of the third party server; and
   first prolonging code configured to cause the at least one processor to prolong, in response to the access amount of the third party server being monitored to exceed a preset access threshold, the first expiration time of the hotspot data, based on the access amount.

11. The server according to claim 8, wherein the computer program code further comprises:
   second obtaining code configured to cause the at least one processor to obtain, in response to the cache area being empty, from the third party server, the hotspot data in the area range, and cache the area range and the hotspot data that is obtained, into the cache area; and
second setting code configured to cause the at least one processor to set the first expiration time for the hotspot data that is obtained.

12. The server according to claim 8, wherein the computer program code further comprises:
third obtaining code configured to cause the at least one processor to obtain, in response to the frequency of the user terminals executing the query operation occurring in the area range not exceeding the predetermined threshold, from the third party server, object information in the area range in which the location information of the remote querying user terminal is located, and cache the area range and the object information that is obtained, into the cache area; and
third setting code configured to cause the at least one processor to set a second expiration time for the object information, the second expiration time for the object information being less than the first expiration time of the hotspot data.

13. A non-transitory computer-readable storage medium storing program code comprising instructions for causing a server to:
receive, from a remote querying user terminal, a first query request that is used to obtain object information, the first query request carrying location information of the remote querying user terminal;
determine a frequency of user terminals executing a query operation in an area range in which the location information of the remote querying user terminal is located
query, in response to a cache area being not empty, the cache area for hotspot data in the area range, the hotspot data being information of an object comprised in the area range, and the hotspot data being cached in response to the frequency of the user terminals executing the query operation in the area range exceeding a predetermined threshold number;
query the cache area for the area range in which the location information of the remote querying user terminal is located, the cache area caching at least a preset area range, and for the hotspot data in the area range;
read, in response to the querying the cache area being successful, the hotspot data in the area range, from the cache area;
in response to the querying the cache area failing, obtain, from a third party server, the hotspot data in the area range, and caching the area range and the hotspot data in the area range, into the cache area;
convert two-dimensional longitude and latitude data that is used to denote the area range into a one-dimensional first character string code;
associate the first character string code and the hotspot data that is obtained;
cache the first character string code associated with the hotspot data that is obtained, into the cache area;
convert longitude and latitude data in the location information of the remote querying user terminal, into a second character string code;
query whether the cache area stores the first character string code that is same as the second character string code;
in response to a determination that the first character sting code is the same as the second character string code, store the area range in the cache and determine that the area range is successfully found through query; and
determine, in response to a determination that the first character sting code is different than the second character string code, that the area range is unsuccessfully queried; and
send, to the remote querying user terminal, the hotspot data in the area range.

14. The storage medium according to claim 13, wherein the instructions are further for causing the server to:
set a first expiration time for the hotspot data that is obtained, the first expiration time being determined based on a frequency at which the hotspot data is queried; and
delete, in response to a time for which the hotspot data is stored in the cache area reaching the first expiration time, the hotspot data, from the cache area.

15. The storage medium according to claim 13, wherein the instructions are further for causing the server to, during the querying the cache area:
monitor a quantity of query times of querying the cache area for the area range;
adjust, in response to the quantity of query times of querying the cache area for the area range being monitored to exceed a preset query threshold, precision of the first character string code to expand a coverage range of the area range that is queried, to obtain an adjusted area range; and
in response to receiving a second query request that is used to obtain object information in the adjusted area range, obtain hotspot data in the adjusted area range, from the third party server, and cache the adjusted area range and the hotspot data in the adjusted area range, into the cache area.

16. The storage medium according to claim 14, wherein the instructions are further for causing the server to, during the obtaining the hotspot data in the area range:
monitor an access amount of the third party server; and
prolong, in response to the access amount of the third party server being monitored to exceed a preset access threshold, the first expiration time of the hotspot data, based on the access amount.

17. The storage medium according to claim 14, the instructions are further for causing the server to, in response to the cache area being empty:
obtain, from the third party server, the hotspot data in the area range in which the location information of the remote querying user terminal is located;
cache the area range and the hotspot data that is obtained, into the cache area; and
set the first expiration time for the hotspot data that is obtained.

18. The storage medium according to claim 14, wherein the instructions are further for causing the server to, in response to the frequency of the user terminals executing the query operation occurring in the area range not exceeding the predetermined threshold:
obtain, from the third party server, object information in the area range in which the location information of the remote querying user terminal is located;
cache the area range and the object information that is obtained, into the cache area; and
set a second expiration time for the object information, the second expiration time for the object information being less than the first expiration time of the hotspot data.

* * * * *